(12) United States Patent
Kim

(10) Patent No.: US 7,870,225 B2
(45) Date of Patent: Jan. 11, 2011

(54) DISK SYSTEM ADAPTED TO BE DIRECTLY ATTACHED TO NETWORK

(75) Inventor: Han-gyoo Kim, Seoul (KR)

(73) Assignee: Zhe Khi Pak, Moscow (RU)

( * ) Notice: Subject to any disclaimer, the term of this patent is extended or adjusted under 35 U.S.C. 154(b) by 0 days.

(21) Appl. No.: 12/701,335

(22) Filed: Feb. 5, 2010

(65) Prior Publication Data

US 2010/0138602 A1 Jun. 3, 2010

Related U.S. Application Data

(62) Division of application No. 09/974,082, filed on Oct. 9, 2001, now Pat. No. 7,792,923.

(60) Provisional application No. 60/240,344, filed on Oct. 13, 2000.

(51) Int. Cl.
*G06F 15/16* (2006.01)
*G06F 3/00* (2006.01)
*G06F 12/00* (2006.01)

(52) U.S. Cl. ............... 709/217; 709/218; 709/236; 709/246; 709/250; 710/5; 710/36; 711/110

(58) Field of Classification Search ......... 709/217, 709/218, 236, 246, 250; 711/110; 710/5
See application file for complete search history.

(56) References Cited

U.S. PATENT DOCUMENTS

| 5,329,619 | A | | 7/1994 | Page et al. |
| 5,426,427 | A | | 6/1995 | Chinnock et al. |
| 5,455,926 | A | | 10/1995 | Keele et al. ............ 711/4 |
| 5,459,857 | A | * | 10/1995 | Ludlam et al. ......... 714/6 |
| 5,463,772 | A | | 10/1995 | Thompson et al. |
| 5,513,314 | A | | 4/1996 | Kandasamy et al. |

(Continued)

FOREIGN PATENT DOCUMENTS

DE 19610840 9/1997

(Continued)

OTHER PUBLICATIONS

EP Communication 94(3) issued in co-pending European Application No. 01 272 932.3-2413 (Issued Aug. 3, 2009) (9 pages).

(Continued)

*Primary Examiner*—Saleh Najjar
*Assistant Examiner*—Vitali Korobov
(74) *Attorney, Agent, or Firm*—Rothwell, Figg, Ernst & Manbeck, P.C.

(57) ABSTRACT

A network-attached disk (NAD) system is disclosed that includes an NAD device for receiving a disk access command from a host through a network, and a device driver at the host for controlling the NAD device through the network, where the device driver creates a virtual host bus adapter so that the host recognizes the NAD device as if it is a local device to the host. The host may run the UNIX or Windows family of operating systems. The NAD device includes a disk for storing data, a disk controller for controlling the disk, and a network adapter for receiving a disk access command from the host through a network port.

22 Claims, 24 Drawing Sheets

U.S. PATENT DOCUMENTS

| | | | |
|---|---|---|---|
| 5,524,247 A | | 6/1996 | Mizuno |
| 5,566,331 A | * | 10/1996 | Irwin et al. ........................ 1/1 |
| 5,642,337 A | | 6/1997 | Oskay et al. ............... 709/230 |
| 5,721,818 A | | 2/1998 | Hanif et al. |
| 5,774,660 A | | 6/1998 | Brendel et al. |
| 5,781,550 A | | 7/1998 | Templin et al. |
| 5,812,930 A | | 9/1998 | Zavrel |
| 5,838,916 A | | 11/1998 | Domenikos et al. |
| 5,845,104 A | | 12/1998 | Rao ........................ 711/113 |
| 5,889,942 A | | 3/1999 | Orenshteyn |
| 5,941,972 A | * | 8/1999 | Hoese et al. ............... 710/315 |
| 5,987,523 A | | 11/1999 | Hind et al. |
| 5,987,627 A | | 11/1999 | Raqlings, III |
| 5,999,808 A | | 12/1999 | Ladue |
| 6,047,307 A | | 4/2000 | Radko |
| 6,085,234 A | | 7/2000 | Pitts et al. |
| 6,128,644 A | | 10/2000 | Nozaki |
| 6,128,690 A | | 10/2000 | Purcell et al. |
| 6,167,490 A | | 12/2000 | Levy et al. |
| 6,175,869 B1 | | 1/2001 | Ahuja et al. |
| 6,216,202 B1 | * | 4/2001 | D'Errico .................... 711/112 |
| 6,314,465 B1 | | 11/2001 | Paul et al. |
| 6,317,775 B1 | | 11/2001 | Colie et al. |
| 6,327,594 B1 | | 12/2001 | Van Huben et al. |
| 6,345,300 B1 | | 2/2002 | Bakashi et al. |
| 6,347,095 B1 | | 2/2002 | Tang et al. |
| 6,351,776 B1 | * | 2/2002 | O'Brien et al. ............. 709/245 |
| 6,356,915 B1 | * | 3/2002 | Chtchetkine et al. ........ 707/823 |
| 6,360,265 B1 | | 3/2002 | Falck et al. |
| 6,366,988 B1 | * | 4/2002 | Skiba et al. ................. 711/165 |
| 6,389,432 B1 | * | 5/2002 | Pothapragada et al. ............. 1/1 |
| 6,393,569 B1 | | 5/2002 | Orenshteyn |
| 6,404,766 B1 | | 6/2002 | Kitai et al. |
| 6,421,753 B1 | * | 7/2002 | Hoese et al. ................ 710/315 |
| 6,449,647 B1 | | 9/2002 | Colby et al. |
| 6,470,389 B1 | | 10/2002 | Chung et al. |
| 6,510,164 B1 | | 1/2003 | Ramaswamy et al. |
| 6,518,965 B2 | | 2/2003 | Dye et al. |
| 6,523,066 B1 | | 2/2003 | Montroy et al. |
| 6,529,996 B1 | * | 3/2003 | Nguyen et al. ............. 711/114 |
| 6,539,446 B1 | | 3/2003 | Chan |
| 6,578,111 B1 | | 6/2003 | Damron et al. |
| 6,594,677 B2 | | 7/2003 | Davis et al. |
| 6,598,068 B1 | | 7/2003 | Clark |
| 6,609,167 B1 | | 8/2003 | Bastiani et al. |
| 6,647,016 B1 | | 11/2003 | Isoda et al. |
| 6,732,104 B1 | | 5/2004 | Weber |
| 6,760,783 B1 | | 7/2004 | Berry |
| 6,807,581 B1 | * | 10/2004 | Starr et al. ................... 709/250 |
| 6,823,458 B1 | | 11/2004 | Lee et al. |
| 6,834,326 B1 | * | 12/2004 | Wang et al. ................. 711/114 |
| 6,894,981 B1 | | 5/2005 | Coile et al. |
| 6,941,576 B2 | | 9/2005 | Amit |
| 6,985,927 B2 | * | 1/2006 | O'Brien et al. ............. 709/213 |
| 7,010,303 B2 | | 3/2006 | Lewis et al. |
| 7,069,312 B2 | | 6/2006 | Kostic et al. |
| 7,069,350 B2 | | 6/2006 | Fujita et al. |
| 7,076,690 B1 | | 7/2006 | Todd et al. |
| 7,124,128 B2 | | 10/2006 | Springer et al. |
| 7,251,704 B2 | | 7/2007 | Solomon et al. |
| 7,254,578 B2 | | 8/2007 | Devarakonda et al. |
| 7,277,955 B2 | | 10/2007 | Elliott |
| 7,376,133 B2 | | 5/2008 | Gettala et al. |
| 7,383,229 B2 | | 6/2008 | Jacoby |
| 2001/0044879 A1 | * | 11/2001 | Moulton et al. ............. 711/114 |
| 2002/0103889 A1 | * | 8/2002 | Markson et al. ............. 709/223 |
| 2003/0014569 A1 | | 1/2003 | Kim |
| 2003/0018403 A1 | | 1/2003 | Braun et al. |
| 2003/0028614 A1 | | 2/2003 | Jeon |
| 2003/0172149 A1 | | 9/2003 | Edsall et al. |
| 2003/0225834 A1 | | 12/2003 | Lee et al. |
| 2004/0068563 A1 | | 4/2004 | Ahuja et al. |
| 2004/0117813 A1 | | 6/2004 | Karaoguz et al. |
| 2004/0220933 A1 | | 11/2004 | Walker |
| 2005/0042591 A1 | | 2/2005 | Bloom et al. |
| 2005/0110768 A1 | | 5/2005 | Marriott et al. |
| 2005/0149682 A1 | | 7/2005 | Kim |
| 2005/0193017 A1 | | 9/2005 | Kim |
| 2005/0193189 A1 | | 9/2005 | Kim |
| 2006/0004935 A1 | | 1/2006 | Seto et al. |
| 2006/0010287 A1 | | 1/2006 | Kim |
| 2006/0045130 A1 | | 3/2006 | Kim |
| 2006/0067356 A1 | | 3/2006 | Kim |
| 2006/0069884 A1 | | 3/2006 | Kim |
| 2006/0155805 A1 | | 7/2006 | Kim |
| 2007/0008988 A1 | | 1/2007 | Kim |

FOREIGN PATENT DOCUMENTS

| | | |
|---|---|---|
| DE | 10038142 | 2/2001 |
| JP | 10-113469 | 5/1998 |
| JP | 10-271562 | 10/1998 |
| JP | 11007404 | 1/1999 |
| JP | 11-114224 | 4/1999 |
| KR | 10-2000-72493 | 12/2000 |
| KR | 10-2001-0088528 | 9/2001 |
| WO | WO99/03297 | 7/1999 |
| WO | WO00/29529 | 5/2000 |
| WO | WO 00/29529 A2 | 5/2000 |

OTHER PUBLICATIONS

Yaron Klein, Sanrad, "Storage Virtualization with iSCSI Protocol; draft-klein-ips-virt-00.txt" (Nov. 2, 2000) (15 pages).

Blunden, Mark, et al, "Storage Networking Virtualization What's it all about?" IBM Redbooks (Dec. 2000) (124 pages).

Schulz, Greg, "SAN and NAS; Complementary Technologies—SAN and NAS provide Storage and Data Sharing" Internet Citation (May 1, 2000) (11 pages).

Blunden et al., "Storage Network Virtualization: What's it all about?", ibm.com/redbooks, XP-002286341, pp. 1-110, Dec. 2000.

Klein, Yaron, "Storage Virtualization with iSCSI Protocol", Internet Draft, XP-015030964, pp. 1-15, Nov. 2, 2000.

Schulz, Greg, "SAN and NAS; Complementary Technologies", http://www.mti.com/white_papers/WP20002.pdf, XP-002201566, pp. 1-7, May 1, 2000.

Supplementary European Search Report, Application No. 01272932.3, 4 pages, Nov. 5, 2007.

Japanese Office Action, App. No. 555298/2002, Jan. 9, 2007.

Japanese Office Action, App. No. 513300/2003, Feb. 6, 2007.

* cited by examiner

DISK SYSTEM ADAPTED TO BE DIRECTLY ATTACHED TO NETWORK

CROSS REFERENCE TO RELATED APPLICATIONS

This application is a divisional of U.S. patent application Ser. No. 09/974,082, filed on Oct. 9, 2001 now U.S. Pat. No. 7,792,923, and claims the benefit of U.S. Provisional Application Ser. No. 60/240,344, filed Oct. 13, 2000, the entire disclosures of which are incorporated herein by reference.

BACKGROUND OF THE INVENTION

1. Technical Field

This invention in general relates to computer systems. More specifically, this invention relates to a disk system or interface that can be directly attached to a network.

2. Description of the Related Art

As the Internet becomes popular, the amount of data that needs to be stored has drastically increased. Especially, there is a high demand for a high-capacity disk drive to store multimedia data. For example, a demand for a disk system having a disk capacity of terabytes per server is not unusual.

A tape drive or a CD drive may be used to store such amount of data, but its performance and user convenience are not matched to those of a hard disk drive. However, increasing the capacity of a hard disk in a conventional server system presents some problems.

There are NAS (Network Attached Storage) products that can be connected to a network, usually Ethernet, to provide a pre-configured disk capacity along with integrated system/storage management using the NFS (Network File System) protocol, the CIFS (Common Internet File System) protocol, or both on top of the IP protocol used on the Internet. The primary purpose of these protocols is to exchange files between independently operating computers. Therefore, the client using the NAS for file access experiences the difference between its local storage and the storage in the NAS systems.

The NAS is basically a stripped-down version of a file server having mainly the functions of storing and retrieving files. Accordingly, increasing a disk capacity using a NAS product amounts to adding a separate file server in practice, which presents many shortcomings. Since an NAS disk is not seen as a local disk to the client, the installation, movement, and administration of an NAS disk should be done only through the operating system and software offered as part of the NAS system. An NAS disk is installed in the inside bus of the NAS system, leading to a limitation to the number of disks that can be installed. Since the NAS system has a hard disk under its own operating system, the client cannot use an arbitrary file system to access the hard disk. Further, the NAS system requires an IP address. Overall, not only the installation and administration costs per disk are more expensive than those of a local disk, but also user convenience is severely restricted.

There is SAN (Storage Area Network) that uses the Fibre Channel technology. To use the devices connected to a SAN, a special-type of switch is needed. For example, Fiber Channel uses a Fibre Channel hub or a Fibre Channel switch. The SAN has some shortcomings. Typically, a separate file server is used. In general, the SAN equipment is expensive, and so is the administration cost of the SAN system because, for example, it often requires an administrator with a specialized knowledge on the system.

Therefore, there is a need for an interface that allows a disk system to be directly attached to a network, while still being accessed like a local disk without the need of adding an additional file server or special equipment.

SUMMARY OF THE INVENTION

It is an object of the present invention to provide a disk system that can be directly attached to a network connecting to a host without going through a network file system.

Another object is to provide a disk system that can be recognized and used as a local disk to a host without requiring additional facility such as an additional file server, a special switch, or even an IP address, if appropriate.

Still another object of the present invention is to provide a disk system that can be conveniently connected to a server without much intervention of network/server administration.

Yet another object is to provide a low-cost disk system, many of which can be plugged into existing network ports to readily satisfy a disk capacity demand.

Further object is to provide an interface that allows a device attachable to a bus to be plugged into a network port.

The foregoing and other objects are accomplished by providing a network-attached disk (NAD) system that includes an NAD device for receiving a disk access command from a host through a network, a device driver at the host for controlling the NAD device through the network, where the device driver recognizes the NAD device as a local device. The host may run the UNIX or Windows family of operating systems. The NAD device includes a disk for storing data, a disk controller for controlling the disk, and a network adapter for receiving a disk access command from the host through a network port.

DETAILED DESCRIPTION OF THE INVENTION

Figure 1:
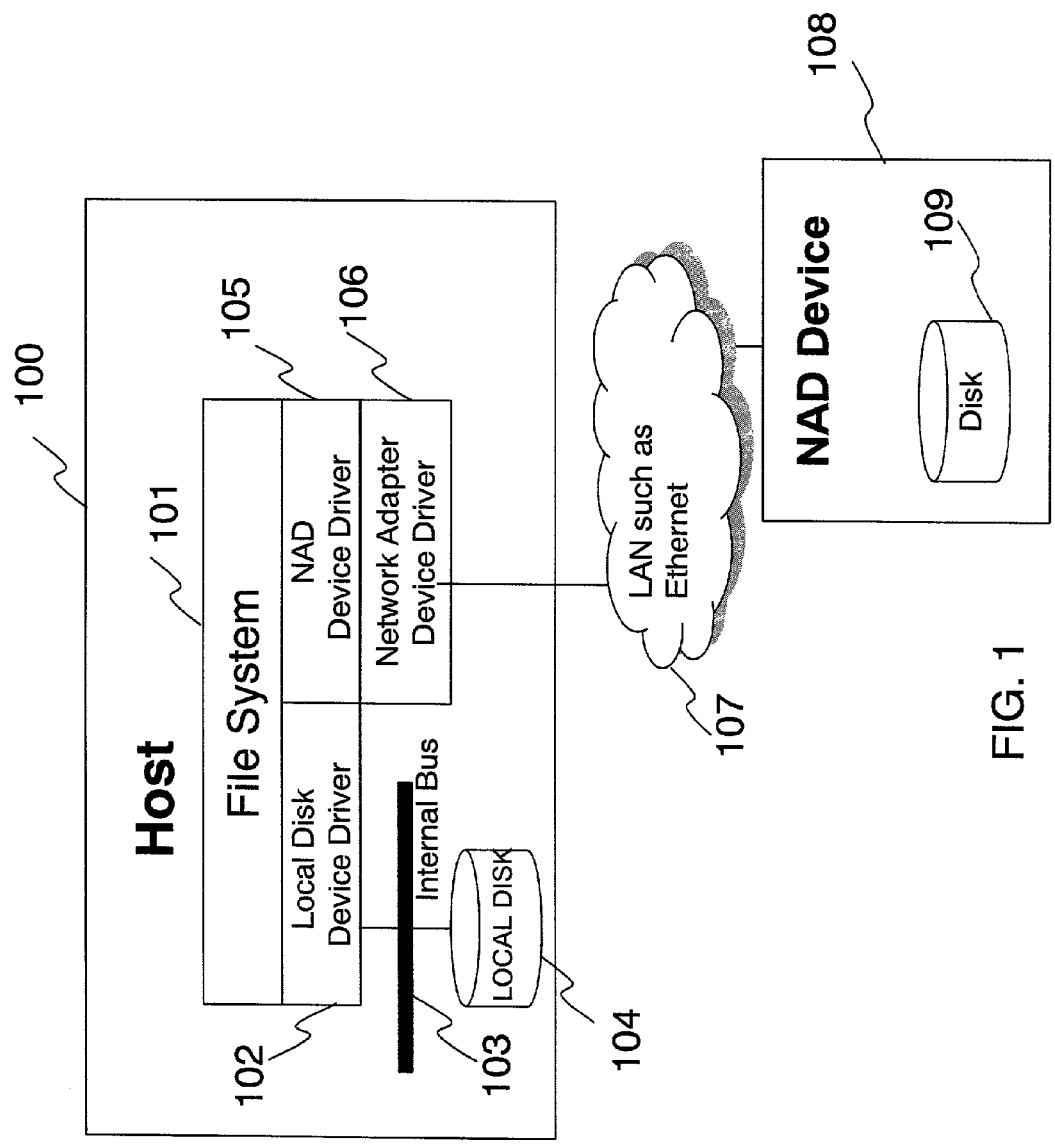
FIG. 1 is a block diagram of an environment where a network-attached disk (NAD) system of the present invention is used.

FIG. 1 shows an environment where the present invention is used. A host 100 has a file system 101, which may contain a local disk device driver 102 that controls a local disk 104 connected to an internal system bus 103. A local device is defined as a device inside a standard-alone system as opposed to a network device connected to a network. Local devices are directly connected to a system bus often through an adapter called a host bus adapter allowing the host to communicate with the devices without going through any network, whereas network devices are not directly connected to a system bus, rather connected through an interface called a network interface card (NIC) installed on system bus. The local disk 104 may be a conventional IDE (Integrated Drive Electronics) disk or SCSI (Small Computer System Interface) disk.

The file system 101 also contains a network-attached disk (NAD) device driver 105 of the present invention that controls an NAD device 108 connected through a network adapter device driver 106 and a network 107 such as Ethernet. The NAD device 108 of the present invention contains one or more disks 109. The network 107 is an existing general-purpose network for carrying storage traffic as well as other application traffic. This so called "front-end" network for carrying general-purpose network traffic is distinguished from a "back-end" network dedicated to storage such as that used in the conventional Storage Area Network (SAN) scheme.

The present invention features two main components: one is the NAD device driver 105 at the host and the other is the NAD device 108 attached to the network.

Figure 2:
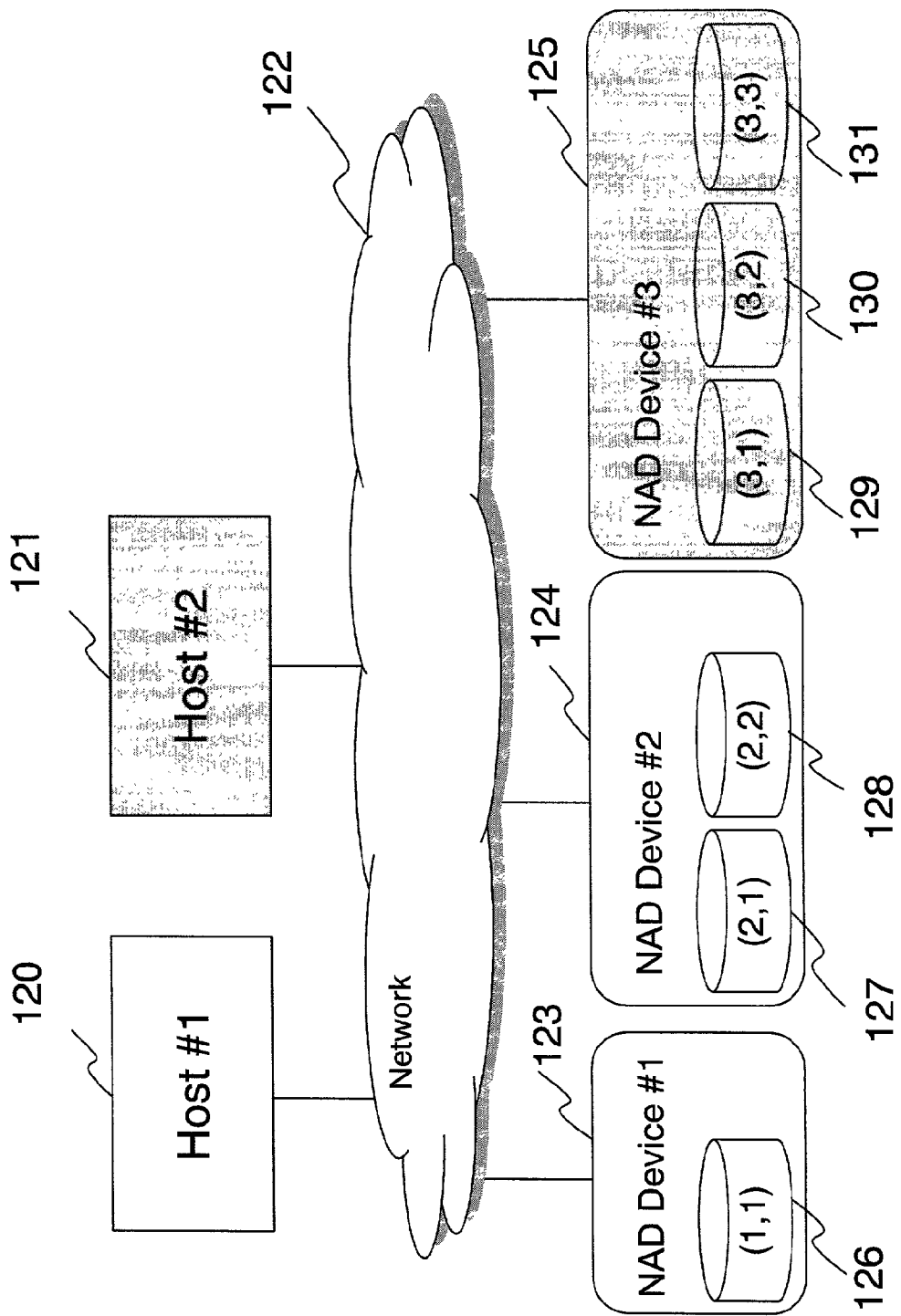
FIG. 2 is an illustration of how multiple NAD devices may be accessed by multiple hosts through a network.

FIG. 2 shows an example of how multiple NAD devices are accessed by multiple hosts through a network. NAD device #1 123 with disk(1,1) 126 and NAD device #2 124 with disk(2,1) 127 and disk(2,2) 128 are accessed by Host #1 120 through a network 122, while NAD device #3 125 with disk (3,1) 129, disk(3,2) 130, disk(3,3) 131 is accessed by Host #2 121 through the same network 122.

Each disk appears to the host as if it is a local disk connected to the system bus of the host so that each disk can be dynamically installed or removed. The present invention achieves this by creating a virtual host bus adapter in purely software means that recognizes an NAD device as if it is connected to the system bus although there is no physical host bus adapter connected the NAD. This is distinguished from the conventional Network Area Storage (NAS) scheme where a NAS device connected through the MC is still recognized as an independent file server connected to a network.

The Open Systems Interface (OSI) model defines 7 layers of protocols: a physical layer for electrical interface definitions, a data link layer for communication using data frames, a network layer for routing packets from one end to another, a transport layer for dividing messages into packets, a session layer for establishing communication session, a presentation layer for data presentation format, and an application layer for application programs. The present invention uses a data link layer protocol to contain storage commands into data link frames. Because the NAD device is not acting as an independent devices to the host, there is no need to use a network address such as IP address.

Since the specific configuration of the hosts and the disk systems can be dynamically changed, user convenience and portability is preserved as in the case of using a local disk. There is virtually no restriction to the number of disk systems that can be attached to the network, thus providing an unlimited disk storage capacity for a host.

Figure 3:
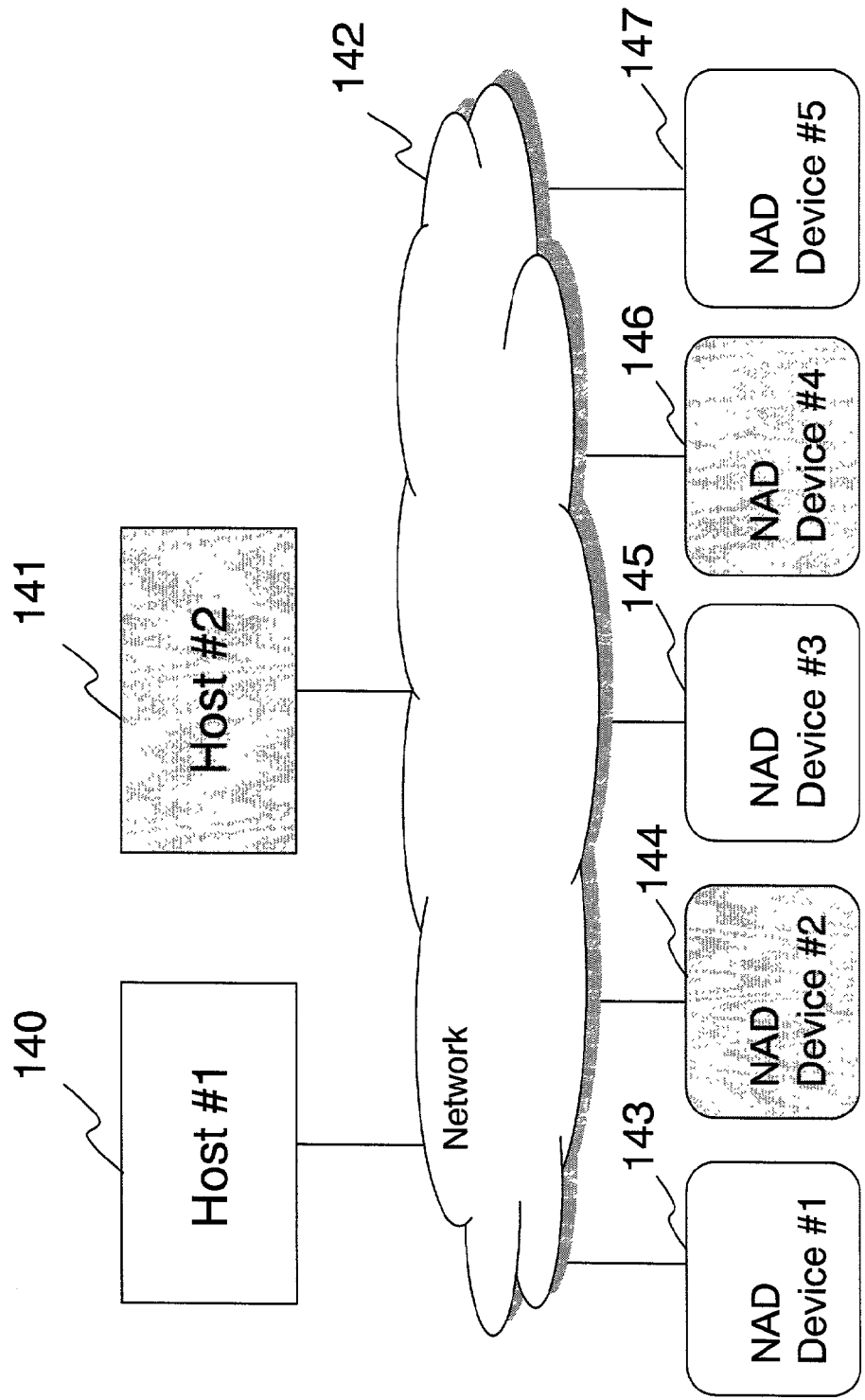
FIG. 3 is an example of how multiple NAD devices are accessed by multiple hosts.

FIG. 3 shows another example of how multiple NAD devices are accessed by multiple hosts through a network. NAD device #1 143, NAD device #2 145, and NAD device #5 147 are accessed by Host #1 140 through a network 142, while NAD device #2 144 and NAD device #4 146 are accessed by Host #2 141 through the same network 142.

Figure 4:
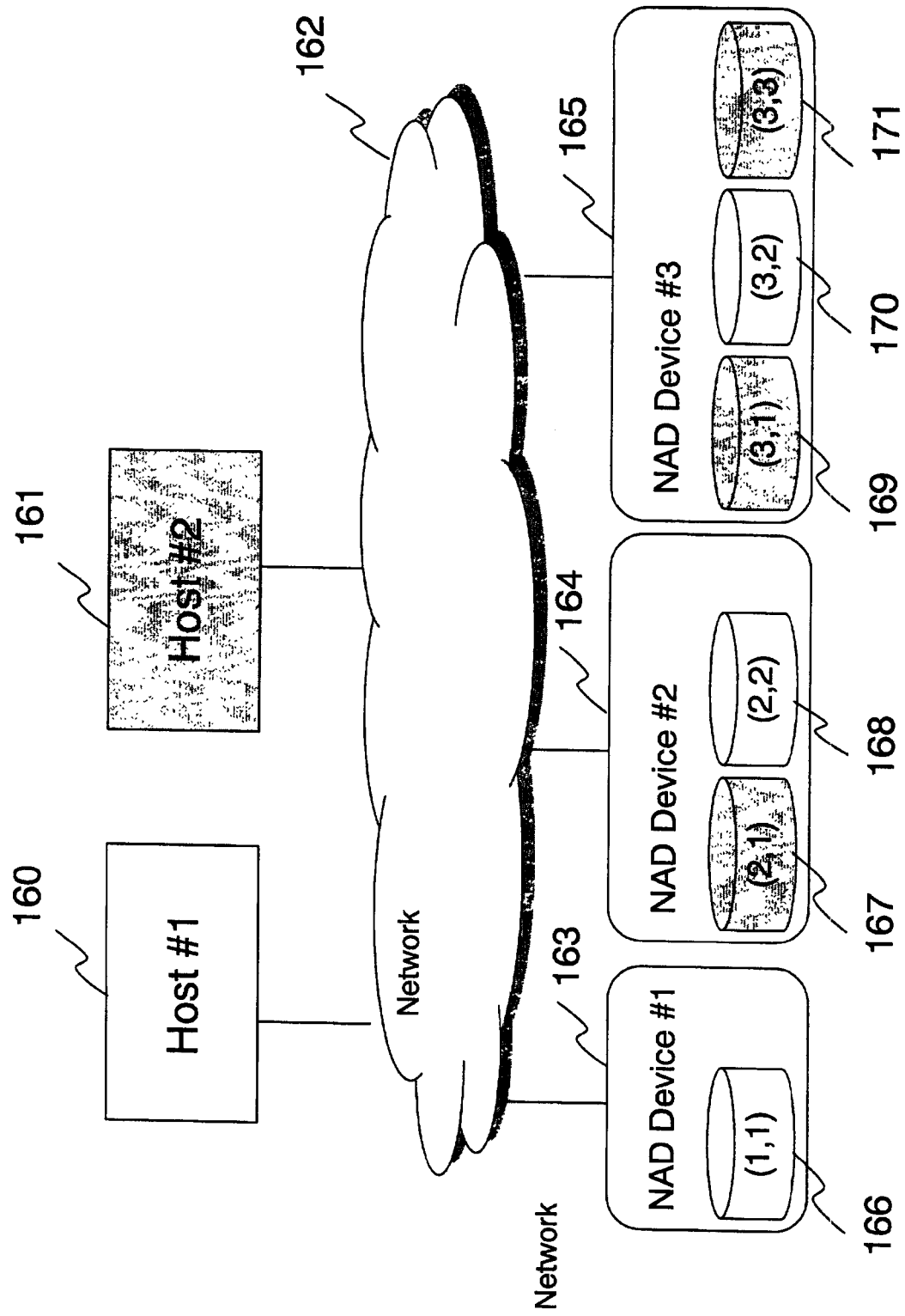
FIG. 4 is another example of how each disk inside an NAD may be treated as a separate disk.

The disks contained in an NAD may be treated as separate disks so that each of them can be independently accessed by a host. FIG. 4 shows an example of treating each disk inside an NAD device as separate disks. Disk(1,1) 166 inside NAD device #1 163, disk(2,2) 168 inside NAD device #2, and disk(3,2) 170 inside NAD device #2 are accessed by Host #1 160 through a network 122 while disk(2,1) 167 inside NAD device #2 164 and disk (3,1) 169 and disk (3,3) 171 inside NAD device #3 165 are accessed by Host #2 161 through the same network 162. Note that disk (2,1) 167 and disk (2,2) 168, inside NAD device #2 164, are independently accessed by Host #1 160 and Host #2 161 respectively.

Block Device Driver

An embodiment of the NAD system will be explained with an example running the UNIX family of operating systems although other operating systems such as Windows may also be used.

Each block device for block data storage, such as a disk device, is assigned a major device number to distinguish among different kinds of block devices, and a minor device number to distinguish among same kinds of block devices. In UNIX, each device is accessed through a device file, which provides an interface for accessing the real device. Device files are usually generated in advance, each with a major device number and a minor device number as well as information on a block device driver.

The purpose of the device driver is to handle the requests made by the kernel with respect to a device. The device driver isolates device-specific codes to provide a consistent interface for the kernel. In order to activate the operation of a device driver, a device file and device driver routines must be prepared, after which the functions of the driver routines must be registered so that the operating system such as UNIX can understand their availability. This is usually done by passing the major number assigned to the device and the functions of the driver routines as parameters.

Registration and Unregistration of Block Device Driver

Once a block device driver is registered by passing the device's major device number and the driver functions as parameters, it may be unregistered by passing the major number.

Table 1 lists the functions used to either register or deregister a device driver.

TABLE 1

| Functions | Description |
|---|---|
| Register_blkdev( ) | register a driver by taking a major number and driver functions as parameters |
| Unregister_blkdev( ) | unregister a driver by taking a major number |

Table 2 lists the general functions used by the local driver and the NDA driver.

TABLE 2

| Driver Function | Description |
|---|---|
| Read( ) | used to read data in the device |
| write( ) | used to write data in the device |
| ioctl( ) | used to change a particular value of a structure for a driver or to control input/output with respect to a device |
| open( ) | used to initialize a driver |
| release( ) | used to eliminate a driver |
| fsync( ) | used to reflect the content of buffer cache to the real device driver |
| check_media_change( ) | used to sense a change in the device condition |
| revalidate( ) | used to update device managed by the deriver and device driver itself |

Table 3 lists examples of the driver functions specific to the IDE local disk driver and the NAD driver.

TABLE 3

| Driver Function | IDE Local Driver Function | NAD Driver Function |
|---|---|---|
| read( ) | ide_read( ) | netdisk_read( ) |
| write( ) | ide_write( ) | netdisk_write( ) |
| ioctl( ) | ide_ioctl( ) | netdisk_ioctl( ) |
| open( ) | ide_open( ) | netdisk_open( ) |
| Release( ) | ide_release( ) | netdisk_release( ) |
| fsync( ) | ide_fsync( ) | netdisk_fsync( ) |
| check_media_change( ) | ide_check_media_change( ) | netdisk_check_media_change( ) |
| revalidate( ) | ide_revalidate( ) | netdisk_ide_revalidate( ) |

Figure 5:
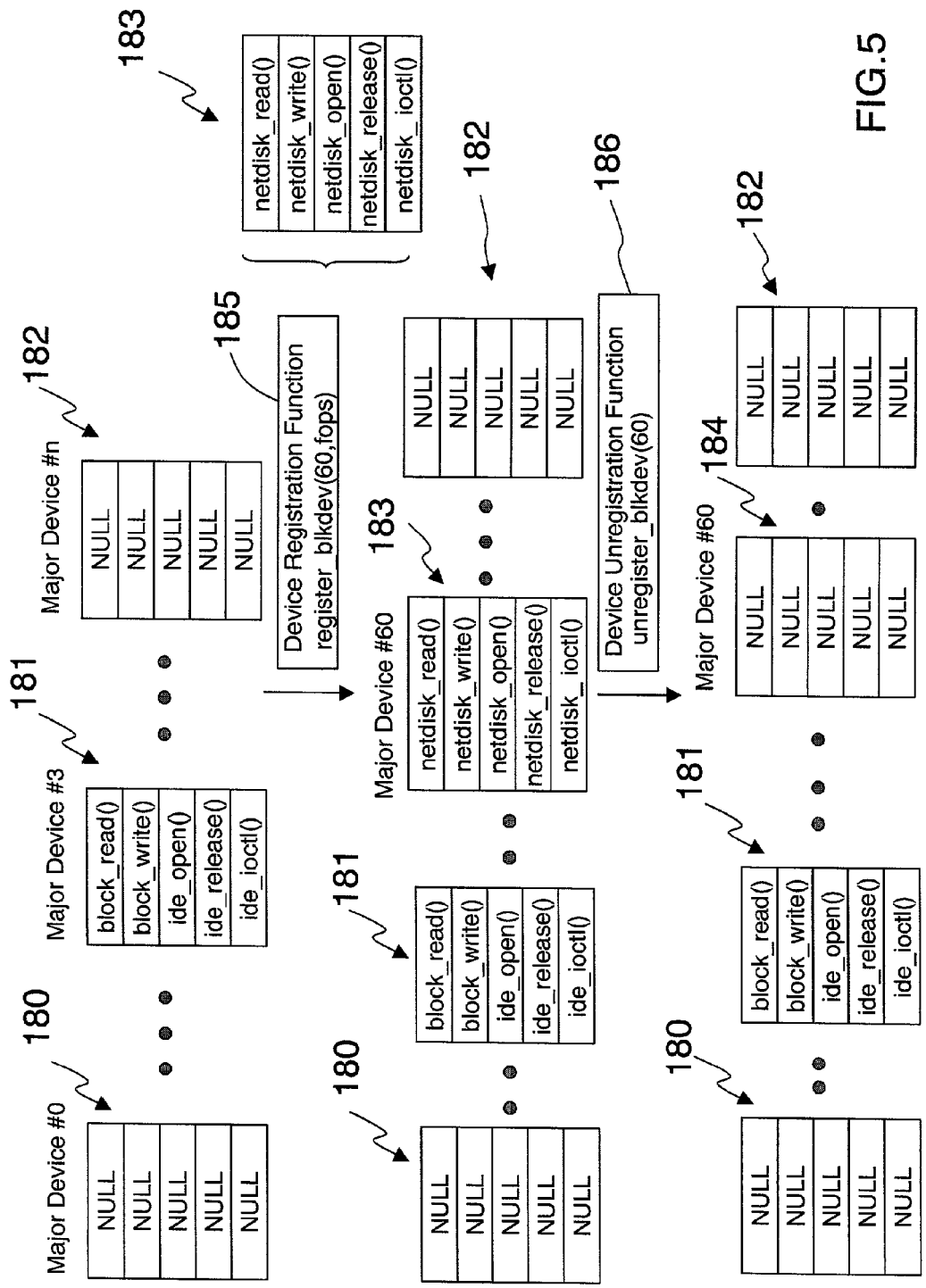
FIG. 5 is an illustration of how a block device driver, specifically an NAD device driver, is registered and unregistered under the UNIX operating system.

FIG. 5 shows an example where a block device driver, specifically an NAD device driver, is registered and unregistered. Initially, an IDE device driver 181 with major device #3 is created as well as some null device drivers such as major device #0 180 and major device #n 182. Major device #60, 183, the NAD device driver that is assigned a major device number of 60, is registered by using a device registration function of register_blkdev(60, fops) 185. Later the NAD device driver is de-registered into major device #60 184, a null device driver, by using a device de-registration function of unregister_blkdev(60) 186. The figure shows that NAD device driver of the present invention is installed in the same way as the existing block device drivers.

Use of Block Device

Once a block device driver is registered and its device file is generated, read/write is done to the device file to access the real device. The device file, however, is not directly called by the user, rather called after being mounted to the file system. Before being mounted, each block device file must be formatted according to a particular file system. Since the NAD device driver of the present invention is prepared in the same way as a conventional local disk driver, the set of I/O commands used to format a conventional local disk can also be used to format a disk in the NAD device. In addition, since NAD devices are controlled in the device driver level, they can be formatted in a required format independent of the file system used.

Figure 6:
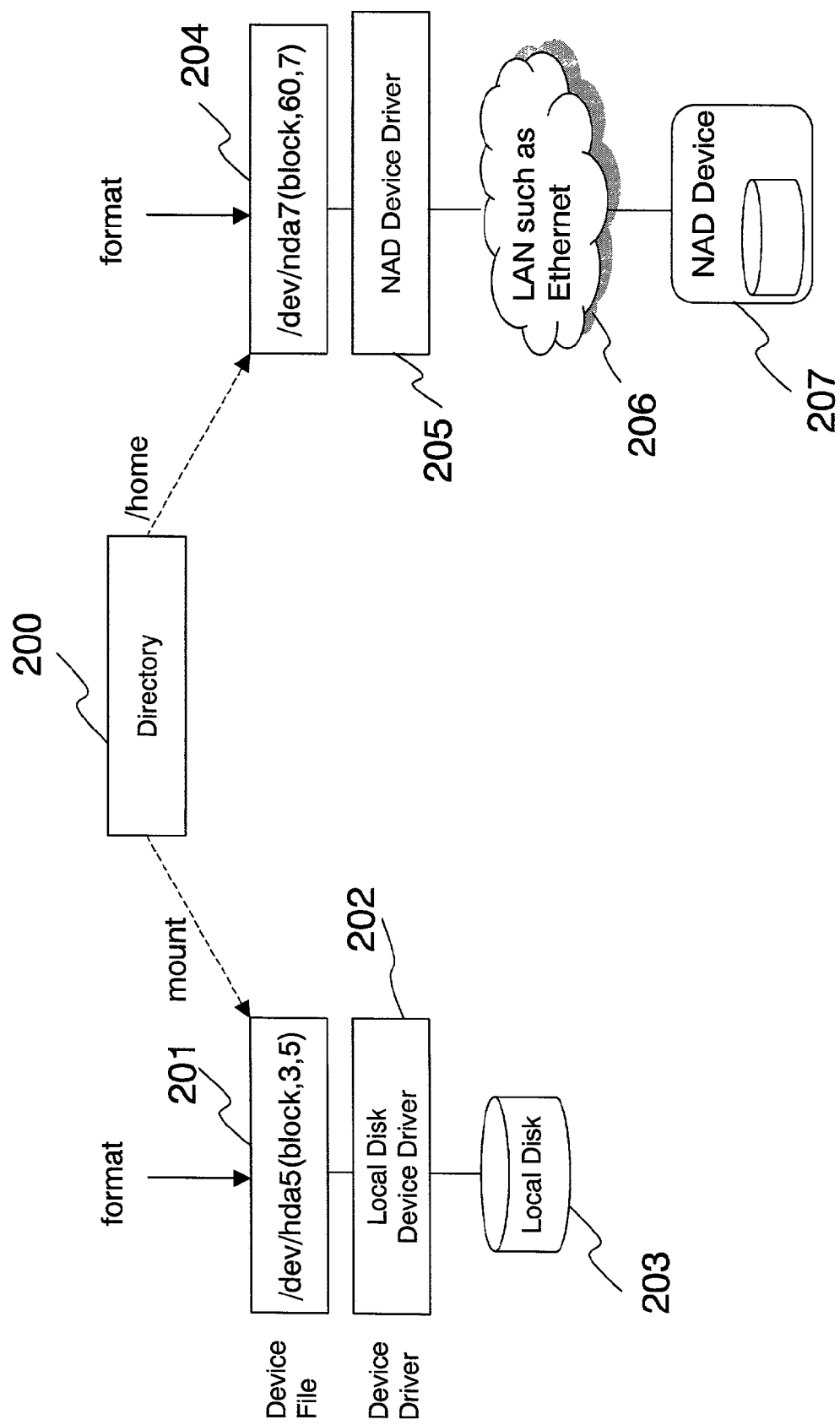
FIG. 6 is an illustration of the relation among the directory, device file, device driver, and device.

FIG. 6 shows the relation among the directory, device file, device driver, and device. The left side shows attachment of a conventional local disk system where a device file 201 mounted on a directory 200 is used by a local disk device driver 202 to control a local disk 203. The right side shows an NAD system of the present invention where a device file 204 mounted on the directory 200 is used by an NAD device driver 205 to control a NAD device 207 through a local area network (LAN) 206 such as Ethernet. The two relations are similar except that the NAD device is accessed through the network.

Structure of Block Device Driver

Each block device driver has an I/O request queue to store the I/O requests to the device. The stored requests may be re-scheduled for the purpose of improving the performance. Besides the I/O request queue, each block device driver needs a request function to process the I/O requests in the queue.

Figure 7:
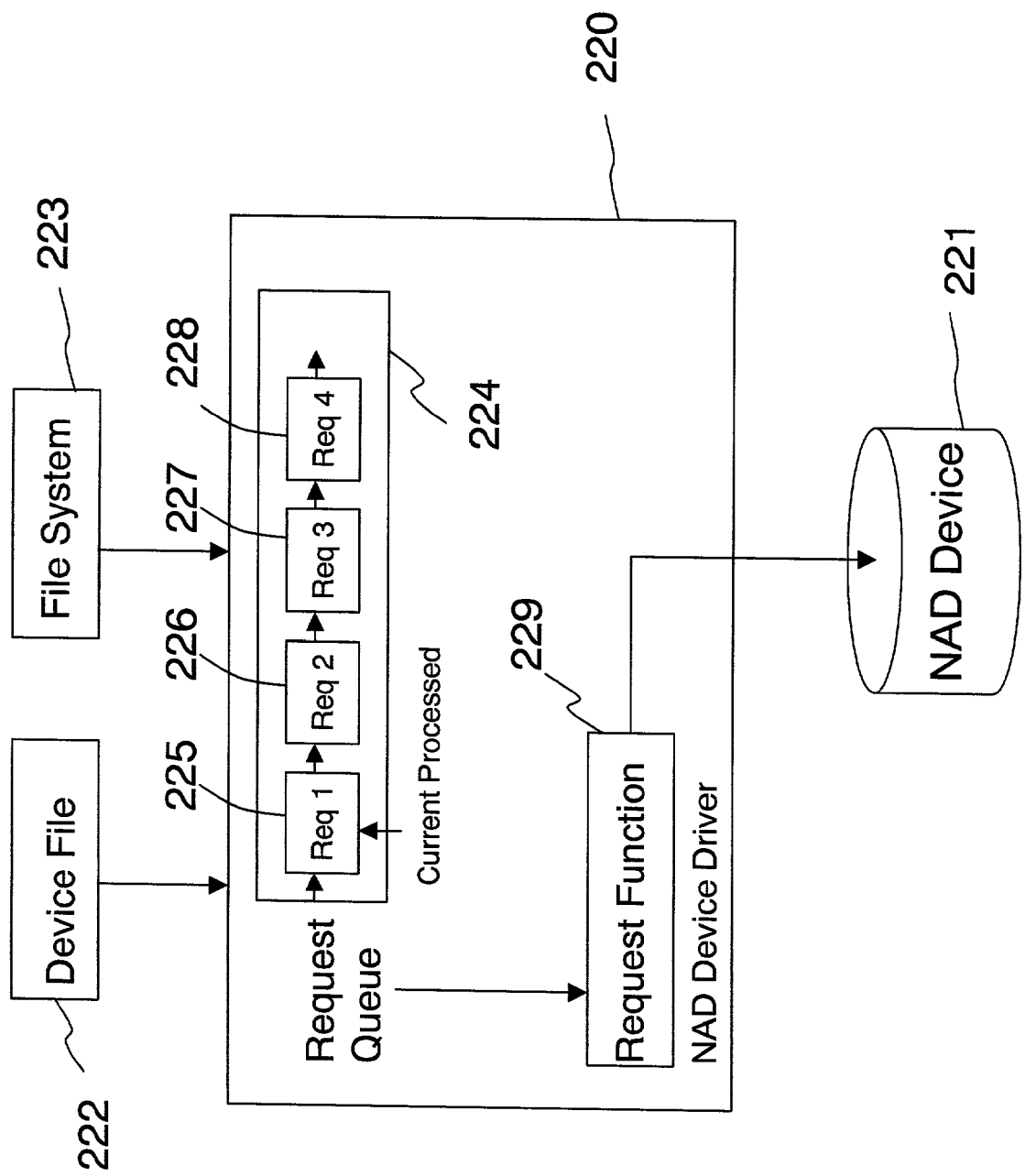
FIG. 7 is an illustration of how a request function directly issues a command to a device.

FIG. 7 shows a situation where the request function directly issues a command to a block device. An NAD device driver 220, using a device 222 and a file system 223, has a queue 224 that stores I/O requests 225 through 228. The NAD device driver 220 has a request function 229 that issues a command to the NAD device 221 by taking a currently processed request 225.

Figure 8:
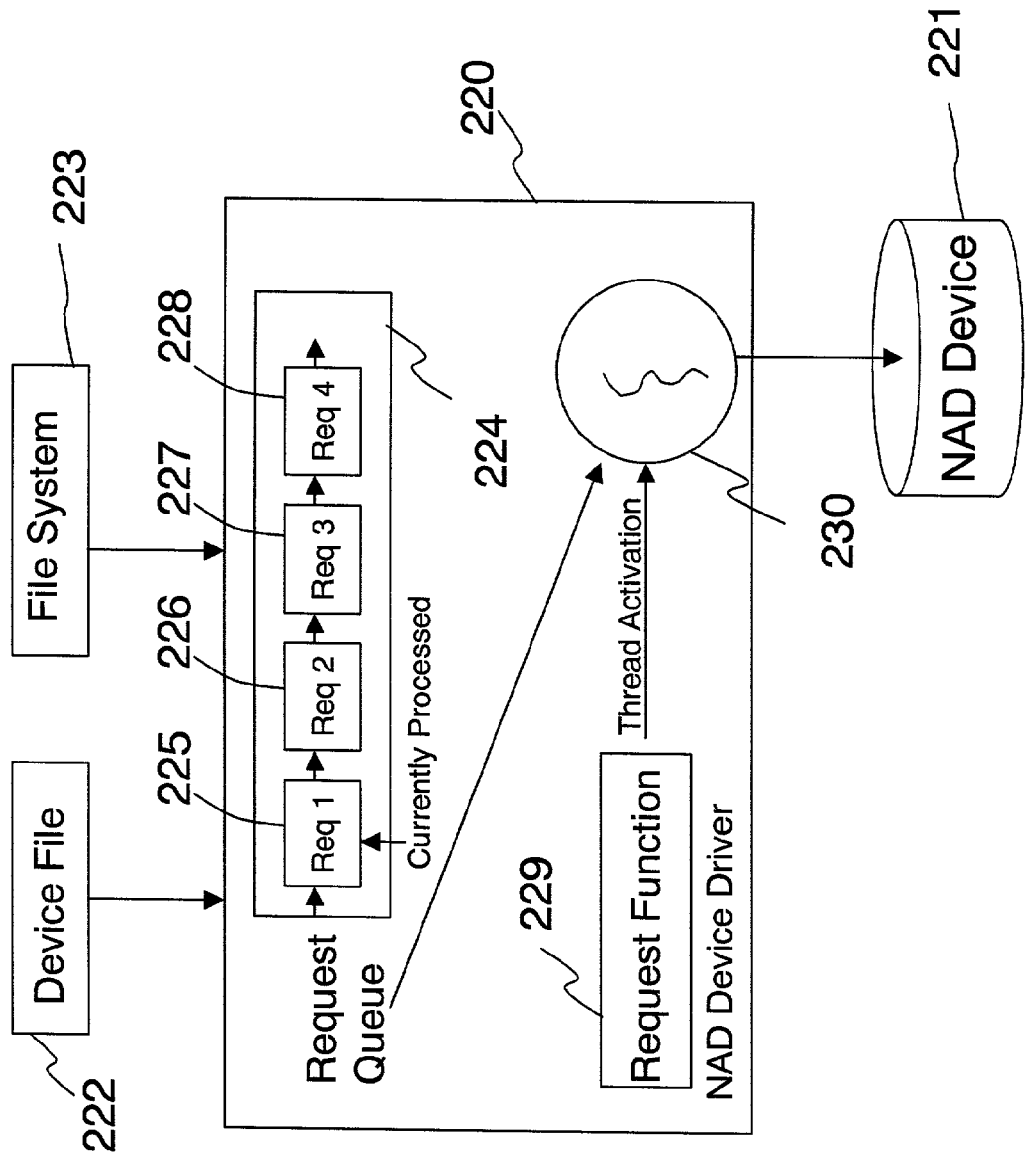
FIG. 8 is an illustration of how a request function activates a device accessing thread.

FIG. 8 shows a situation where the request function 229, instead of directly issuing a command, activates a device accessing thread 230 so that the device accessing thread 230 can issue a command based on the information in the request queue. A thread refers to a single use of a program that can handle multiple users.

Constitution of Local Disk System and NAD System

Figure 9:
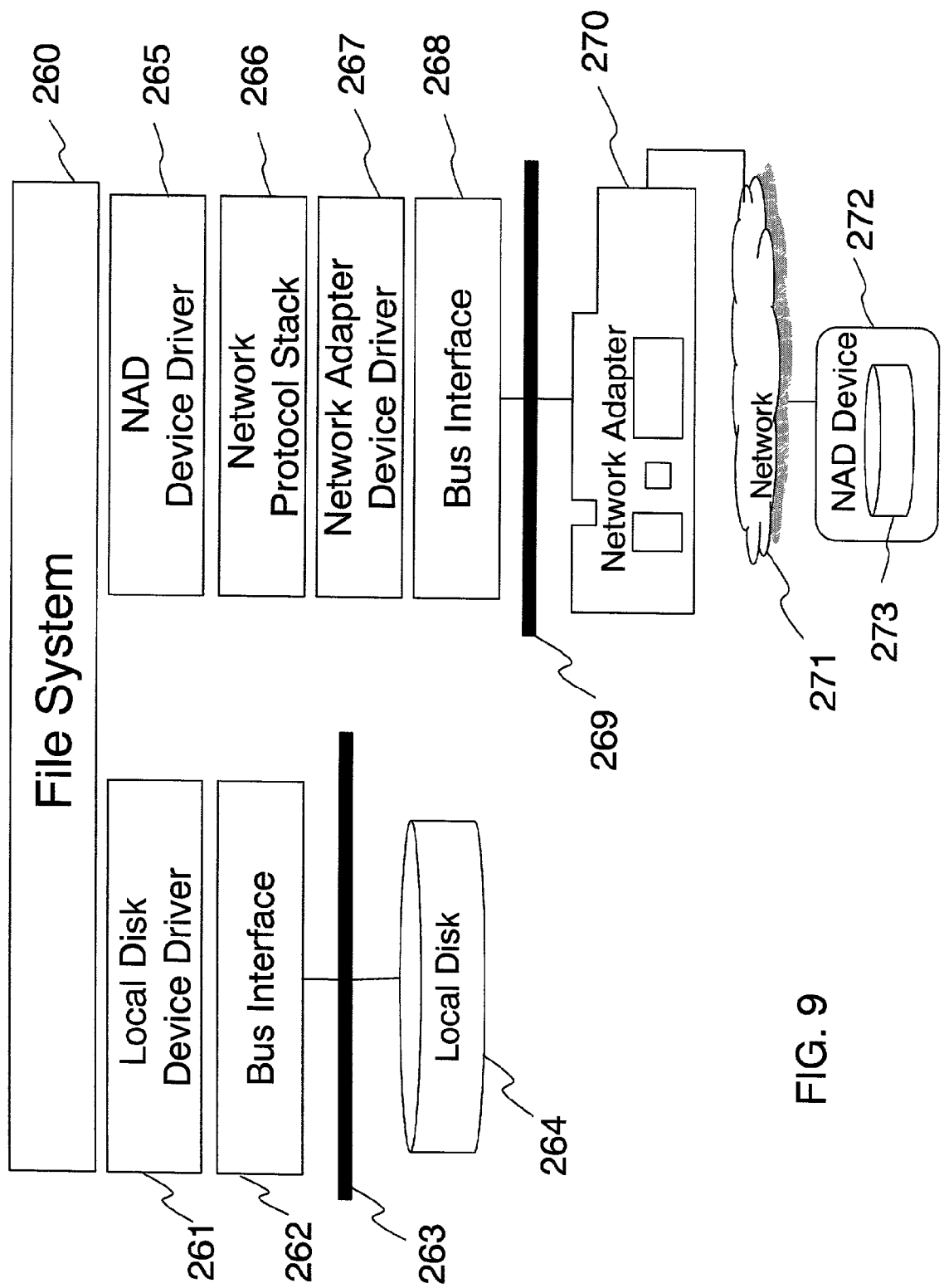
FIG. 9 is a block diagram of a local disk system and that of an NAD device running under UNIX.

FIG. 9 shows the constitution of a conventional local disk system and that of the NAD system operating under UNIX. Under a file system 260, a conventional local disk 264 attached to a local bus 263 is accessed by a conventional local disk device driver 261 through a bus interface 262. Under the same file system 260, an NAD device 272 with a disk 273, attached to a network 271, is accessed by an NAD device driver 265 through a network interface including a network protocol stack 266, a network adapter device driver 267, a bus interface 268, and a network adapter 270.

Since an NAD device is to be used like a local disk, the conventional local disk system and an NAD system of the present invention share a basic structure. The difference is that since an NAD system must communicate with an NAD device through a network, a protocol stack is added for network communication. The NAD driver delivers an I/O command to an NAD device through a network adapter and receives a response from the NAD device.

When an NAD device is accessed, either DMA (Direct Memory Access) or PIO (Programmed Input/Output) may be used. A conventional disk device driver operates in a DMA mode by issuing a DMA I/O command to a local disk with a starting buffer address and a byte transfer count. The local disk then takes over the data transfer, after which it interrupts the CPU. Similarly, the NAD device driver may be implemented to operate in a DMA mode by having the NAD device driver deliver an I/O command to an NAD device, which then completes the data transfer, after which it interrupts the CPU.

The conventional disk driver operates in a PIO mode by the CPU transferring data directly through data registers of the disk device until a particular data block is processed. Similarly, the NAD driver may be implemented to operate in a PIO mode by having the NAD device driver deliver a command to an NAD device and continue to transmit/receive data until a particular block of data is processed.

The network protocol that can be used in the present invention is not restricted to a particular protocol. It can be any connection-oriented protocol including TCP/IP. A connection-oriented protocol ensures that packets are not lost and packets are received in the order they are transmitted. If TCP/IP is used, an IP address must be used for each NAD device.

Local Disk Driver and Generation of NAD Driver

Once UNIX starts, if hardware scan detects any conventional local disks, their corresponding drivers are generated according to the units of the local disks or according to the units of disk partitions. In a similar fashion, NAD devices are identified during initial hardware scan and their corresponding drivers acting as a virtual host bus adapter must be generated. The drivers may be generated automatically by using a device searching thread that periodically identifies NAD devices attached to the network or manually by a system administrator using an NAD management program.

Figure 10:
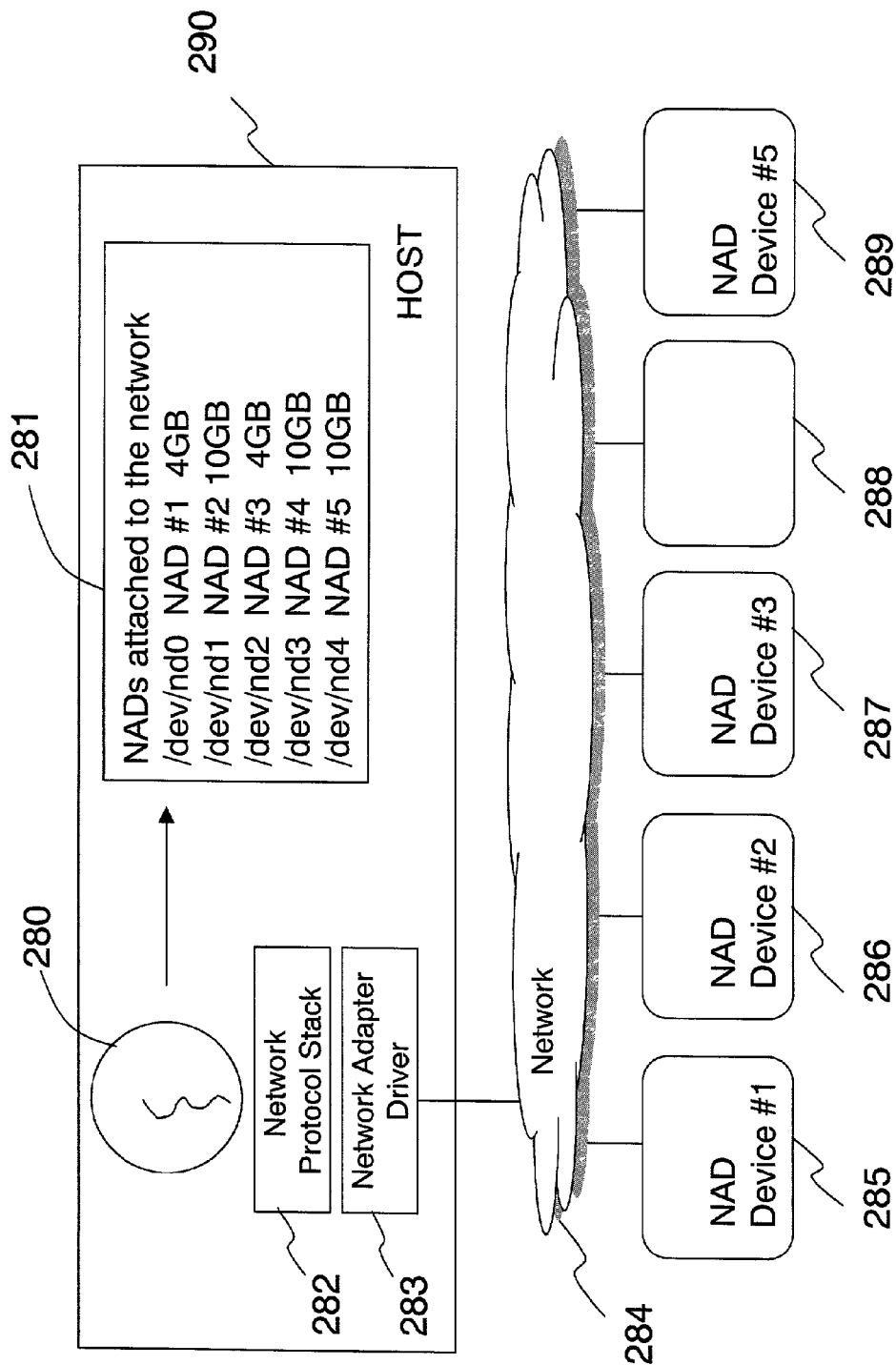
FIG. 10 is an illustration of a device searching thread for identifying the attached NAD devices and for providing the NAD information to the NAD device management program.

FIG. 10 shows a device searching thread for identifying the attached NAD devices and for providing the NAD device information to an NAD device management program. A thread 280 is run in a host 290 through a network protocol stack 282 and a network adapter driver 283 to identify NAD devices 285 through 289 together with the size and device file of each NAD to provide the information 281 to NAD device management program. Once informed of NAD device files available, the user then mounts a selected NAD device file to use a particular NAD device as a local disk.

Network Connection Between NAD Device Driver and NAD Device

In a conventional local disk, disk I/O is performed by reading/writing to I/O ports of the disk controller attached to the internal system bus. But the NAD device driver performs I/O to the corresponding NAD device through a network link. Instead of read/write to an I/O port, I/O is performed by read/write to a network connection such as a socket in UNIX. Therefore, a network connection such as a UNIX socket must be set up between the NAD device driver and NAD device.

Figures 11A, 11B:
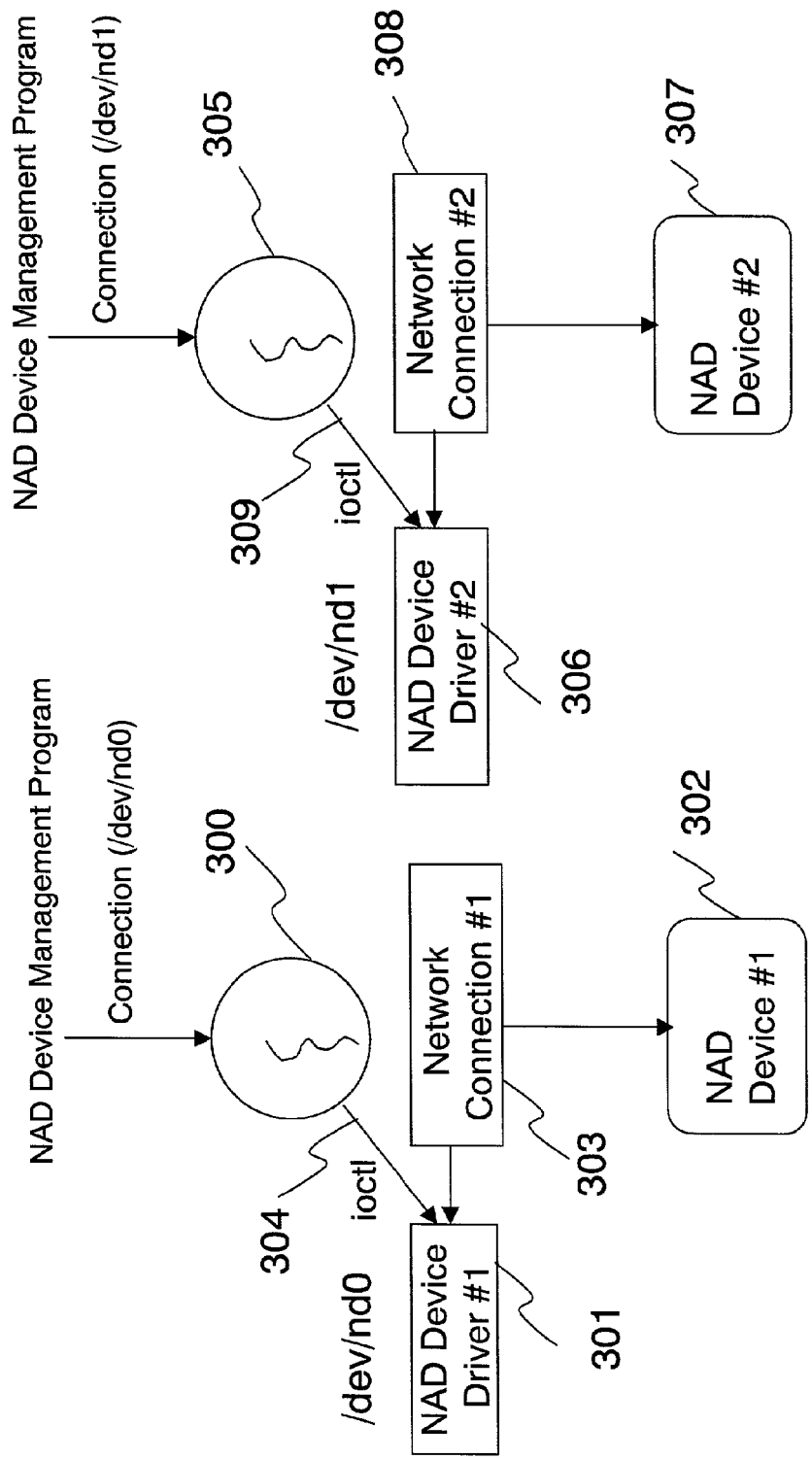
FIGS. 11A and 11B are examples of network connections made between an NAD device driver and its corresponding NAD device using a connection setting thread.

FIGS. 11A and 11B show examples of network connections between an NAD device driver and the corresponding NAD device using a connection setting thread. NAD device #1 302 is connected to NAD device driver #1 301 through a network connection #1 303 created by the ioctl( ) function, 304 while NAD device #2 307 is connected to NAD device driver #2 306 through a network connection #2 308 created by the ioctl( ) function 309.

Implementation of NAD Driver

Figure 12:
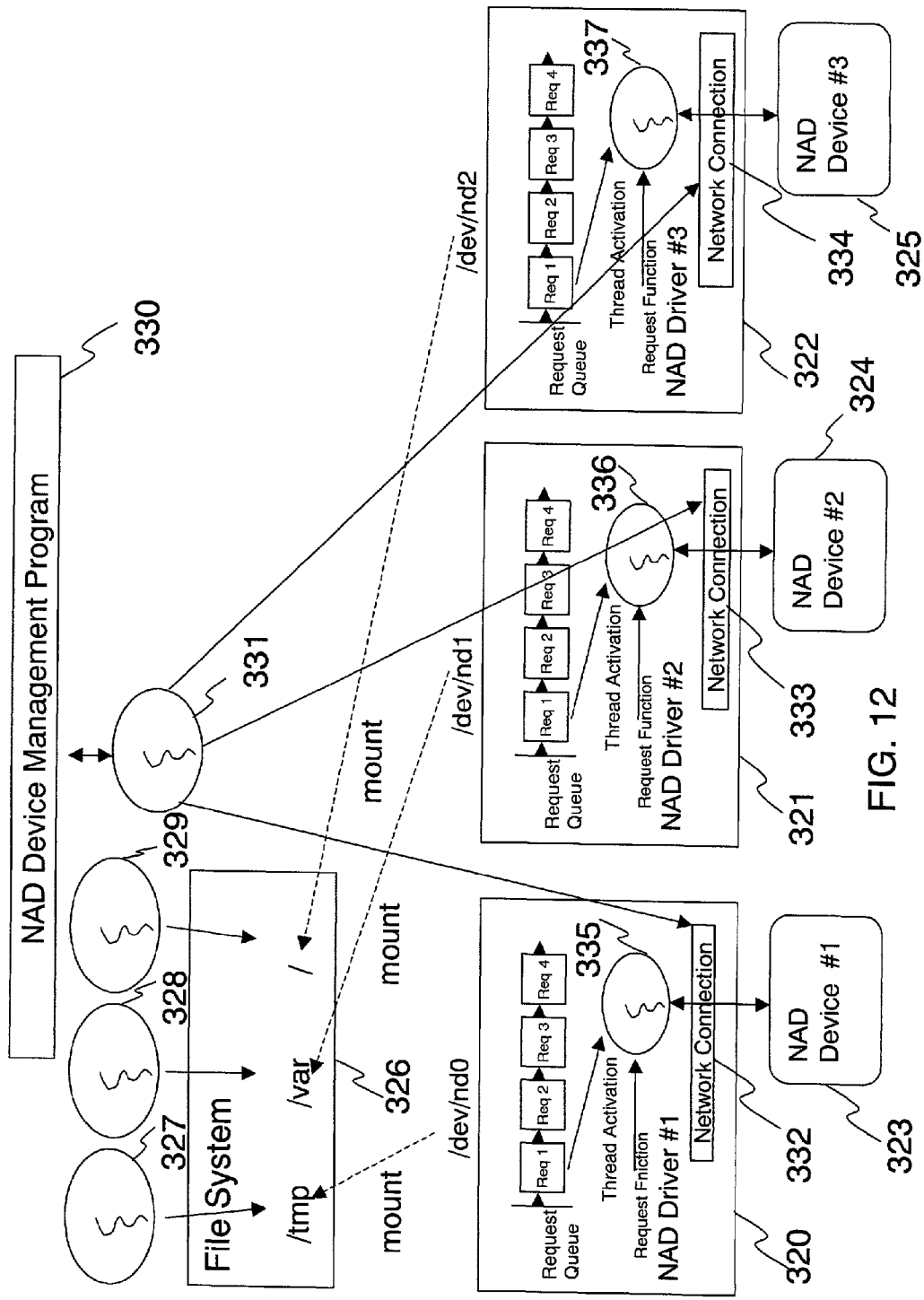
FIG. 12 is an illustration of a method of implementing an NAD device driver, using a device accessing thread.
Figure 13:
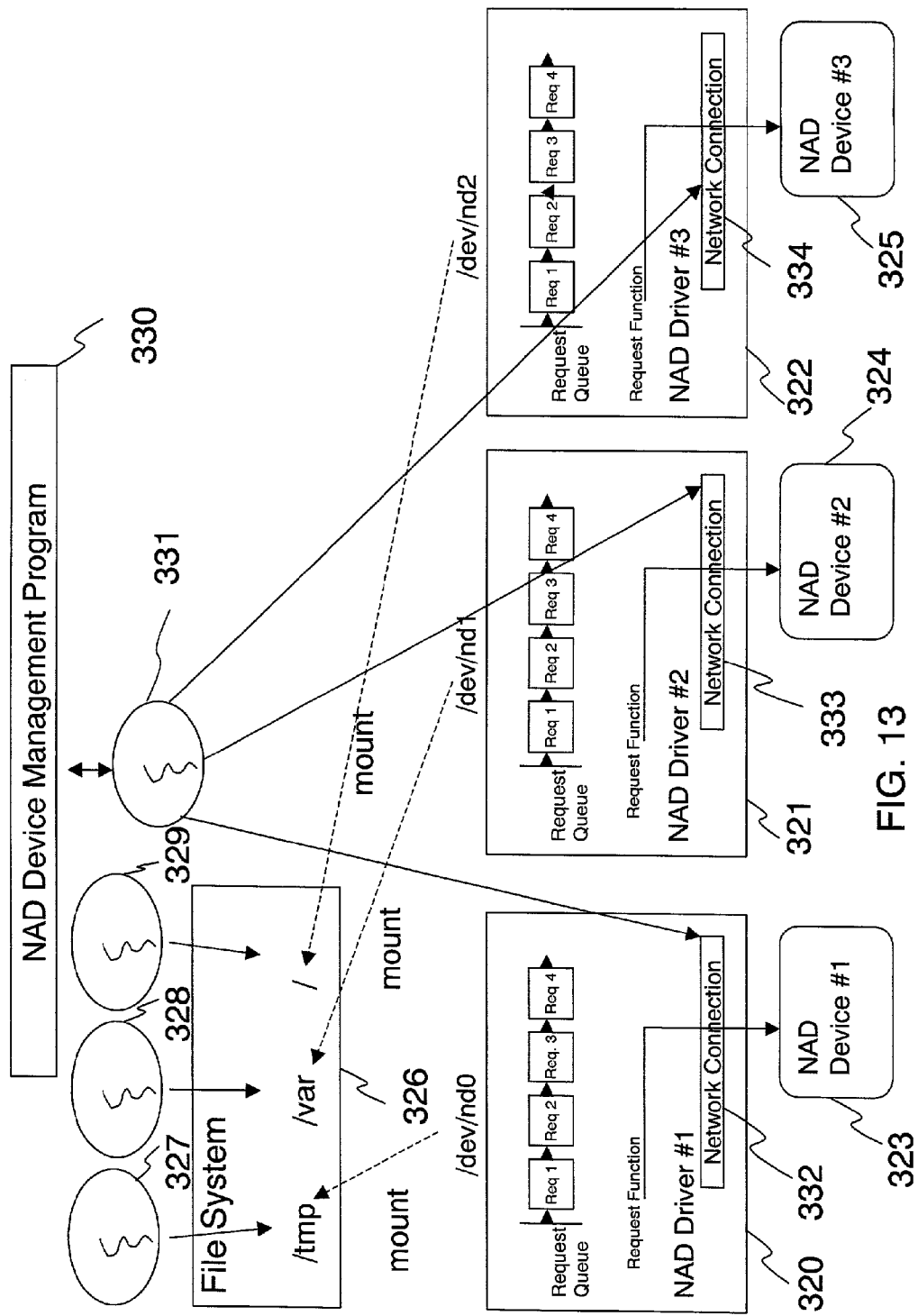
FIG. 13 is an illustration of a method of implementing an NAD device driver, without using a device accessing thread.

FIG. 12 and FIG. 13 show two methods of implementing an NAD device driver, the former with a device accessing thread, and the latter without a device accessing thread.

FIG. 12 shows three NAD drivers 320, 321 and 322 with the device files of "/dev/nd0", "/dev/nd1", "/dev/nd2" to access NAD device #1 323, NAD device #2 324, and NAD device #3 325, respectively. Each device file is mounted to "/tmp", "/var", "/" directory in the file system 326, respectively. User threads 327, 328 and 329 for accessing the file may read/write on the NAD device through the file system 326. A connection setting thread 331 provides the list of NAD devices available to an NAD device management program 330. Based on the user's input, the connection setting thread 331 creates network connections 332, 333 and 334, as necessary.

Referring to FIG. 12, when the user thread requests a file through a file system, the file system first checks the buffer cache to find out whether the requested file block is in the buffer. If the block is in the buffer, the user thread refers to the block. But if the block is not in the buffer, data must be read from the NAD device. The user thread puts the request on the request queue, activates an NAD accessing thread 335 (or 336, 337) responsible for NAD device control through a request function, and the user thread blocks itself. The user thread blocked is awakened later by the NAD accessing thread, such as 335, that received the corresponding data.

FIG. 13 is similar to FIG. 12 except that the user thread now directly requests data from the NAD device rather than using an NAD accessing thread. For example, the user thread puts the request on the request queue, activates a software interrupt that will actually handle block data transfer between the NAD device and the host, and the user thread blocks itself. Once the data transfer is done, an interrupt is generated to wake up the blocked thread.

Communication Protocol Between Host and NAD Device

When a host NAD device driver accesses an NAD device for I/O, the position of the first block and the number of blocks are given as parameters of the I/O command. Or, in the case of SCSI, the I/O command may be in the form of a CDB (Command Descriptor Block).

To transfer the CDB or the block transfer information, a reliable communication protocol is necessary. The present invention is not limited to a particular kind of communication protocol as long as a connection-oriented protocol is used including TCP/IP. A connection-oriented protocol means that packets can be retransmitted in the case packets are lost, and received packets are arranged at the receiver end in the order they were sent.

NAD Device

Figure 14:
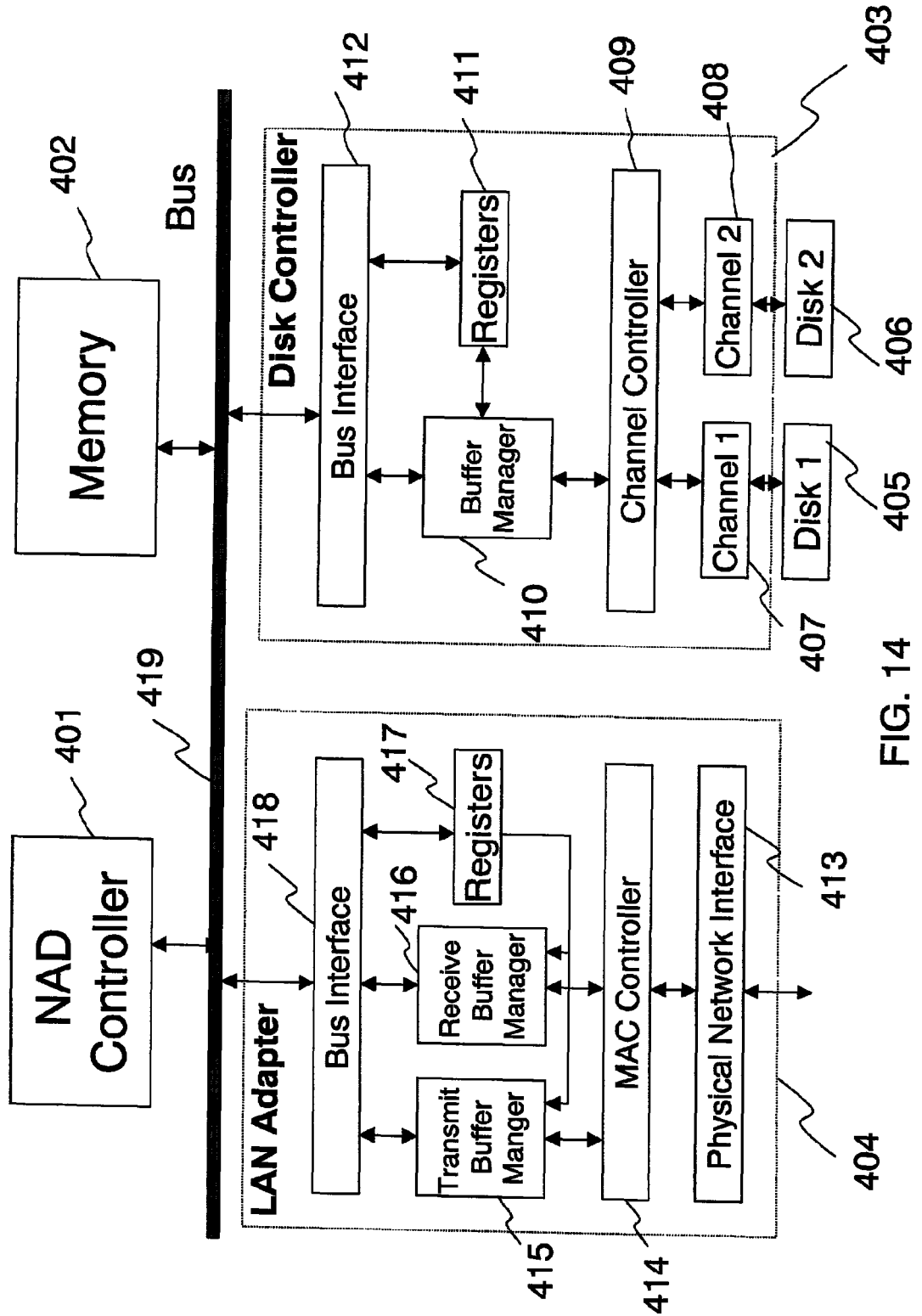
FIG. 14 is an example of an NAD device construction.

FIG. 14 shows a functional block diagram of the NAD device of the present invention. A preferred embodiment of the NAD device is comprised of an NAD controller 401 for controlling the whole NAD device, memory 402, a disk controller 403 for executing a disk access command, one or more disks 405, 406, and a LAN adapter 403 for receiving a disk access command from a host through a network. The NAD controller 401, the memory 402, the disk controller 403, and the LAN adapter 404 are all connected to a bus 419 internal to the NAD device.

The disk controller 403 is a module that performs disk I/O operations by controlling the disks 405 and 406 over internal disk channels. The disk controller 403 is further comprised of one or more disk channels 407 and 408 controlled by a channel controller 409, a buffer manager 410, some registers 411, and a bus interface 412. The buffer manager 410 consults the registers 411 to obtain a disk sector number and a channel to execute a disk access command. The buffer manager 410 also commands the channel controller 409 to transfer data from the memory to disk channel 407 or 408 or vice versa as a result of executing a disk access command. The channel controller 409 actually accesses the disk over the disk channel 407, 408 to transfer data from the disk to the memory or vice versa.

The LAN adapter 404 is a module that receives disk I/O command packets from the host and transmits replay packets over the network. The LAN adapter 404 is further comprised of a physical network interface 413 for interfacing with the network, a MAC (media access control) controller 414, transmit buffer 415 for storing transmit data, a receive buffer 416 for storing receiving data 416, registers 417, and a bus interface 418.

The bus interface 418 transfers data from the bus to the transmit buffer 415, the receive buffer 416, and the registers 417, or vice versa. The MAC controller 414 transfers data to the physical network interface 413 so that the physical network interface can transmit the data to the host computer. When the physical network interface 413 receives a disk I/O request packet from the host computer, it transfers the packet to the MAC controller 414 so that the MAC controller can extract necessary data from the packet and transfer the data to the receive buffer 416.

Figure 15:
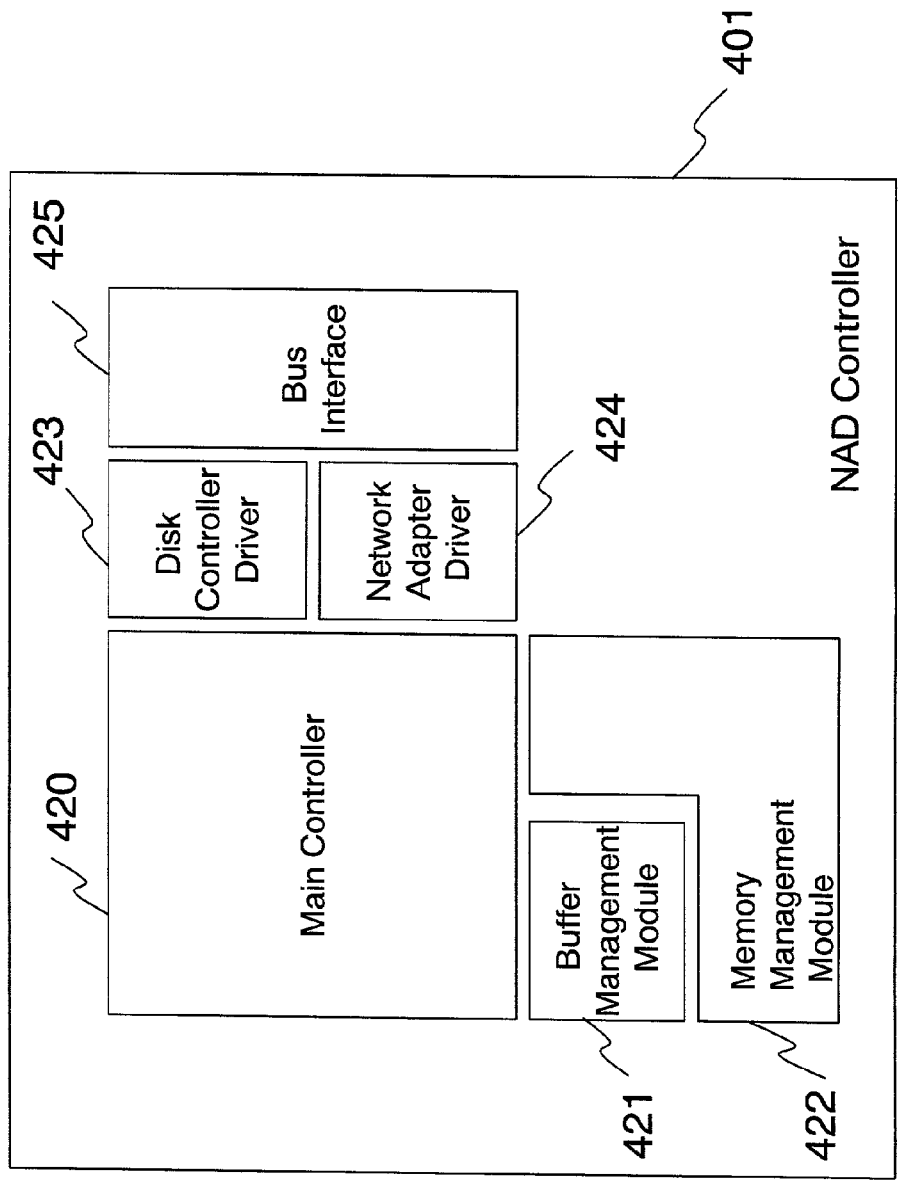
FIG. 15 is a functional block diagram of an NAD controller.

FIG. 15 shows that the NAD controller 401 may be comprised of a main control 420 for controlling the NAD, a buffer management module for caching data in the disk 421, a memory management module for managing assignment of memory space 422, a disk controller driver 423 for interfacing with the disk controller, a network adapter driver 424 for interfacing with the network adapter, and a bus interface 425 for interfacing with the bus inside the NAD.

The NAD controller 401 mainly executes I/O commands from the host's NAD device driver, but it can perform other additional functions. For example, a filter program can be installed to NAD so as to provide features that are not offered in the host, for example, a back up operation. Other examples include access control, access share, access right transfer, etc. Specifically, a filter program can be installed to limit access to an NAD device to a certain time period, to allow several hosts simultaneously access an single NAD, or to transfer one host's access rights to another host. The NAD device driver at the host can request to execute the filter program at the time of I/O command execution through the ioctl( ) function in UNIX.

Figure 16:
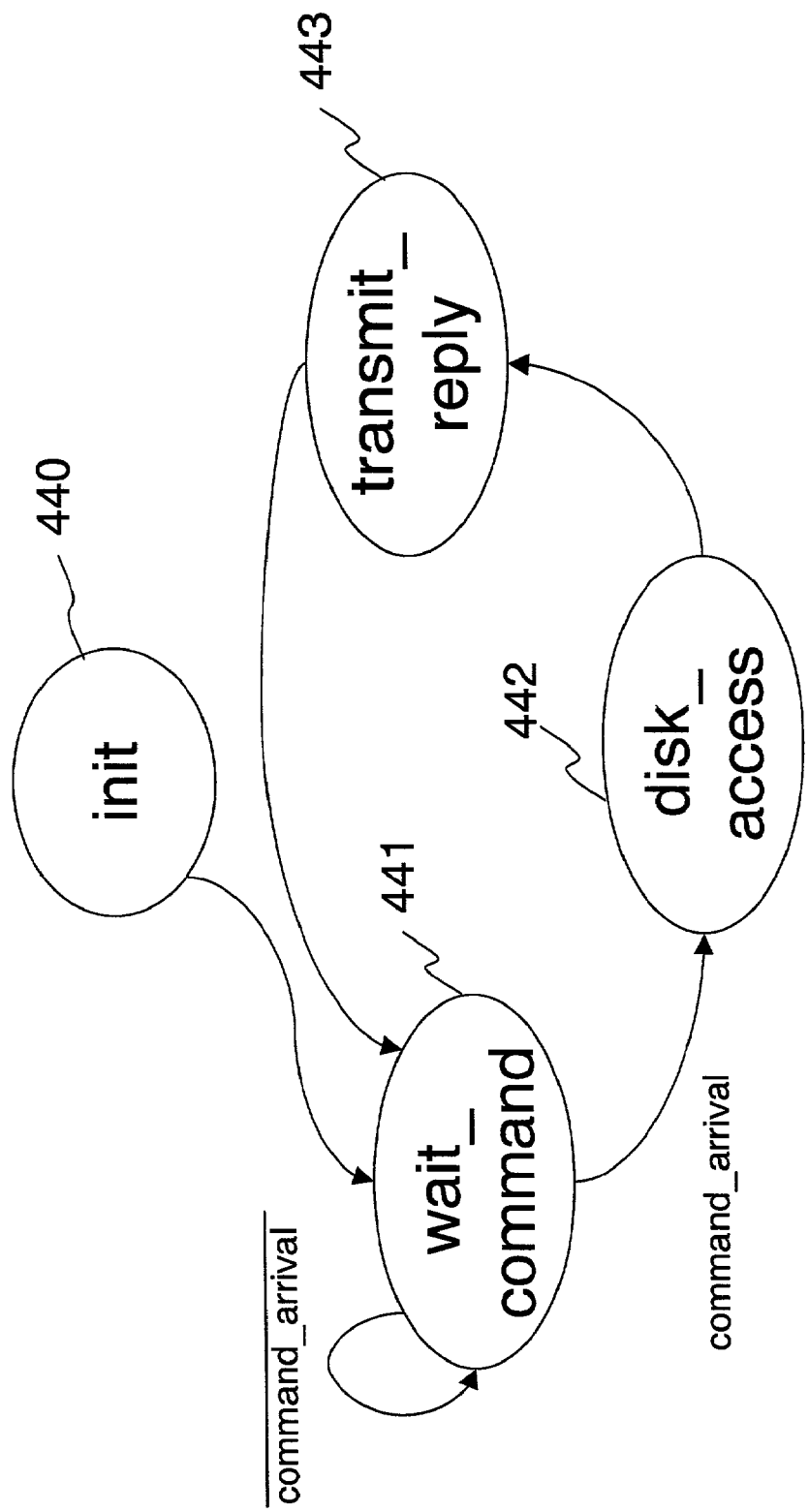
FIG. 16 is a simplified state transition diagram of a state machine used by the main controller of an NAD controller.

FIG. 16 shows a simplified state transition diagram of a state machine used by the main controller 420. At the 'init' state 440, the state machine initializes all the NAD hardware and allocates memory for the disk controller 403 and the LAN adapter 404. Upon completing the initialization process, the state machine makes a transition to 'wait-command' state 441 where the NAD system waits for an incoming I/O command from the host computer over the network. When such I/O command is received from the host computer, the state becomes the 'disk_access' state 442 where an appropriate disk I/O operation is performed through the disk controller. Upon completing the disk I/O, the state moves to the 'transmit_reply' state 443 where the NAD device sends the result to the host computer through the LAN adapter 404. A person skilled in the art would appreciate that the state machine can be readily realized with a CPU and memory.

Network Adapter Driver and Disk Controller Driver

The network adapter and the disk control driver can be implemented at least in two ways. One uses an interrupt mechanism through DMA (Direct Memory Access) and the other uses polling through PIO (Programmable I/O). The former has the advantage of easy programming so that other jobs can be executed without a complete disposition of disk controller data. The latter has the advantage of dispensing with time delay due to interrupts, but has the disadvantage of an inefficient processor usage due to the time spent for continuous read and write.

Additional Embodiments of NAD Drivers

Usually, an NAD device driver is generated for each disk unit attached. However, just as a local disk may be partitioned, the disk inside an NAD device may also be partitioned into several disk partitions where each disk partition can be accessed by a separate device driver. Alternatively, several disks located in the physically separate NAD devices may be combined for use as a logically single disk.

Figure 17:
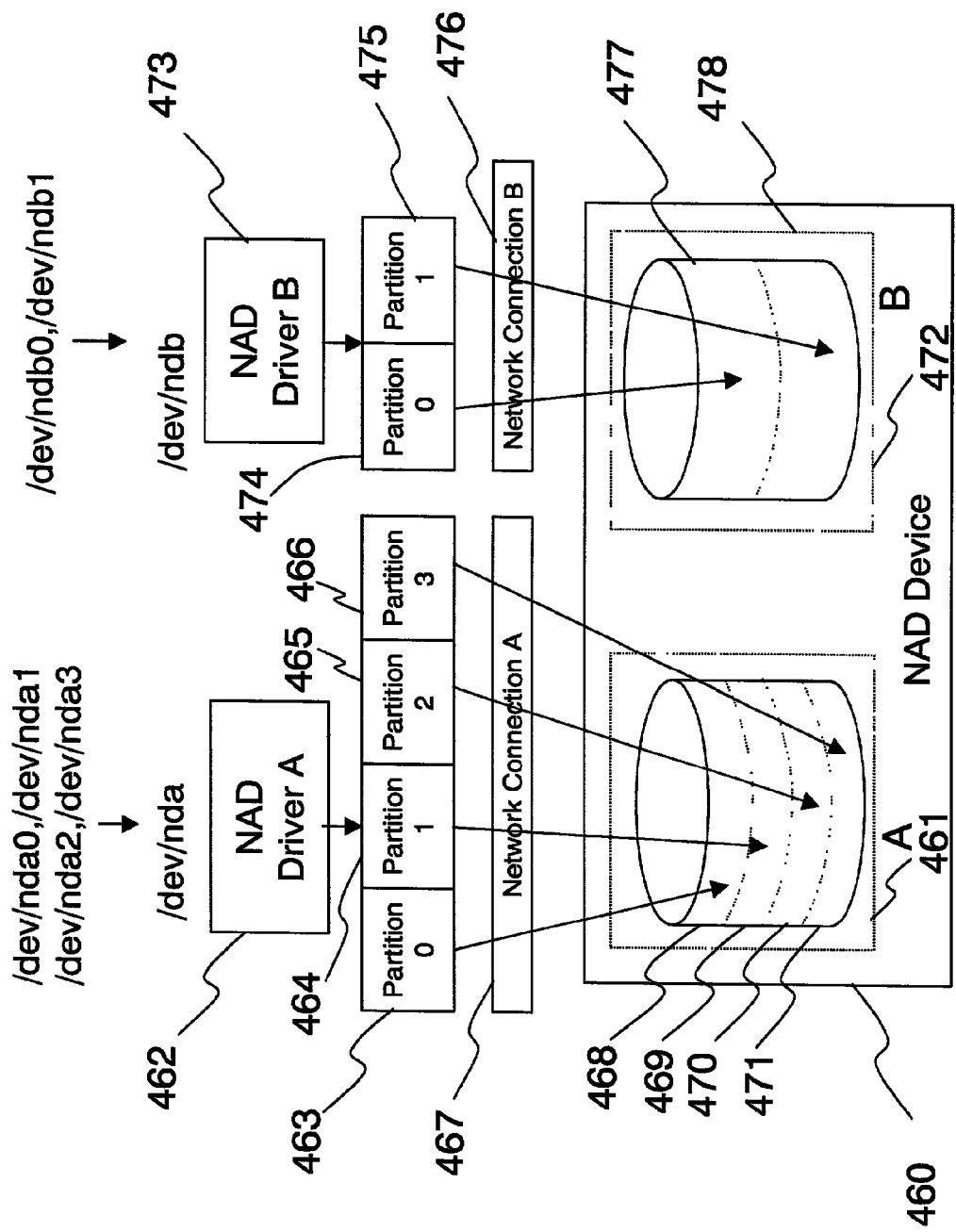
FIG. 17 is an illustration of how a disk inside an NAD device may be divided into disk partitions to which a device driver is assigned.

FIG. 17 shows an example where the disk inside an NAD device may be divided into several disk partitions where all of the partitions are assigned a single device driver. An NAD driver A 462, for example, is assigned to four partitions 463-466 so that the NAD driver A 462 refers the partition table in order to handle I/O requests directed to specific partitions 468 through 471 of a disk 461 inside a NAD device 460, respectively, using a same network connection 467. Similarly, an NAD driver B 473 is assigned to two partitions 474 and 475 so that the NAD driver B 473 can be used to control two disk partitions 477 and 478 of a disk 472 inside the NAD device 460.

Figure 18:
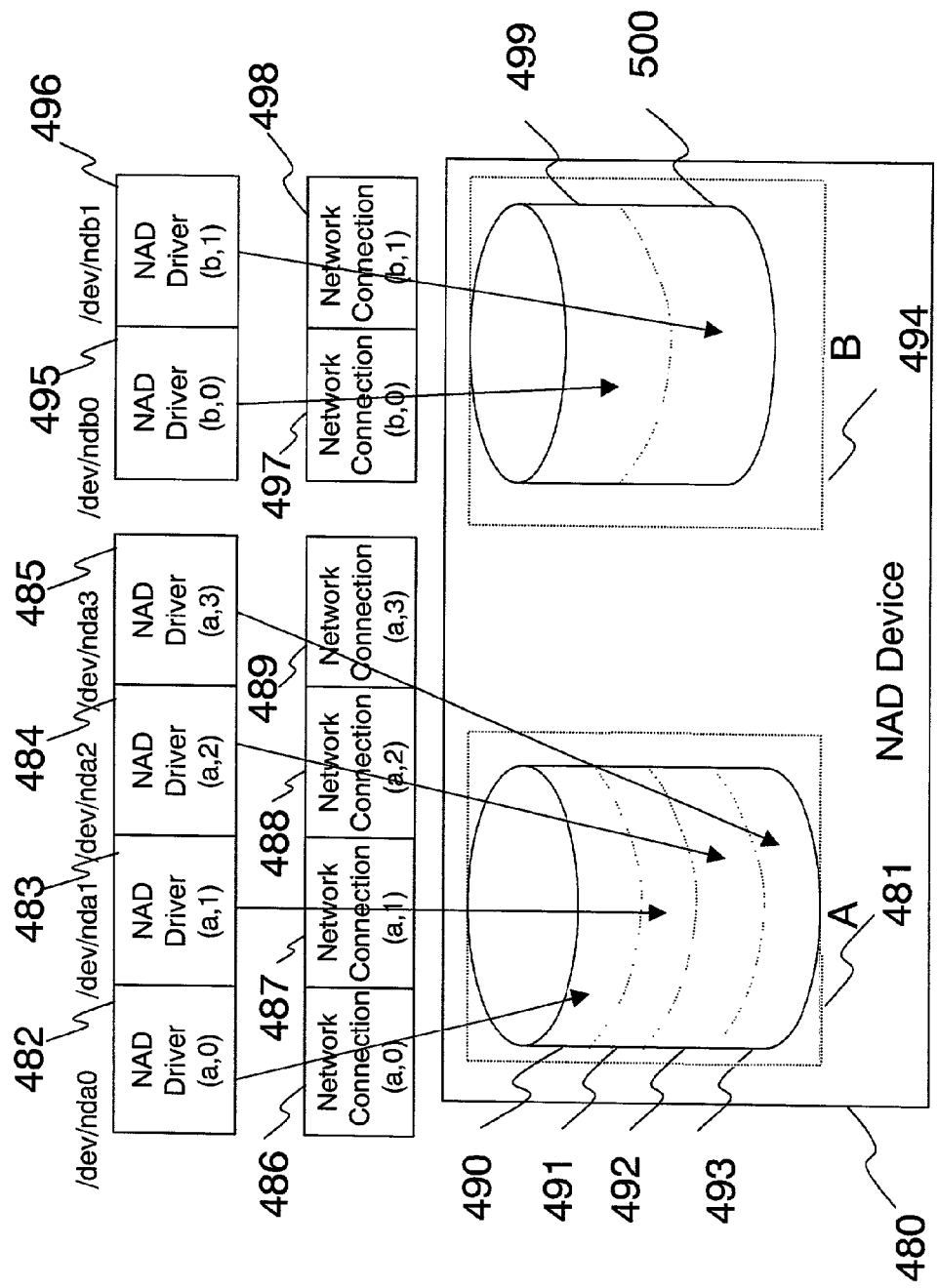
FIG. 18 is an illustration of how separate NAD device drivers may be generated so that a physically single disk can be assessed by different file systems.

FIG. 18 shows an example where separate NAD device drivers may be generated so that a physically single disk can be assessed by different file systems. Disk A 481 inside an NAD device 480 is divided into four partitions 490 through 493, and four separate NAD driver (a,0) through driver (a,3) 482 through 485 are created so that each NAD driver can control each disk partition through a separate network connection 486 (487, 488, or 489). Similarly, disk B 494 inside the NAD device 480 is divided into two partitions 499 and 500, and two separate NAD drivers (b,0) and NAD drive (b,1) 495 and 496 are created so that each NAD driver can control each disk partition through a separate network connection 497 (or 498). Since different network connections are used, this configuration enables a physically single hard disk to be mounted to different file systems.

Figure 19:
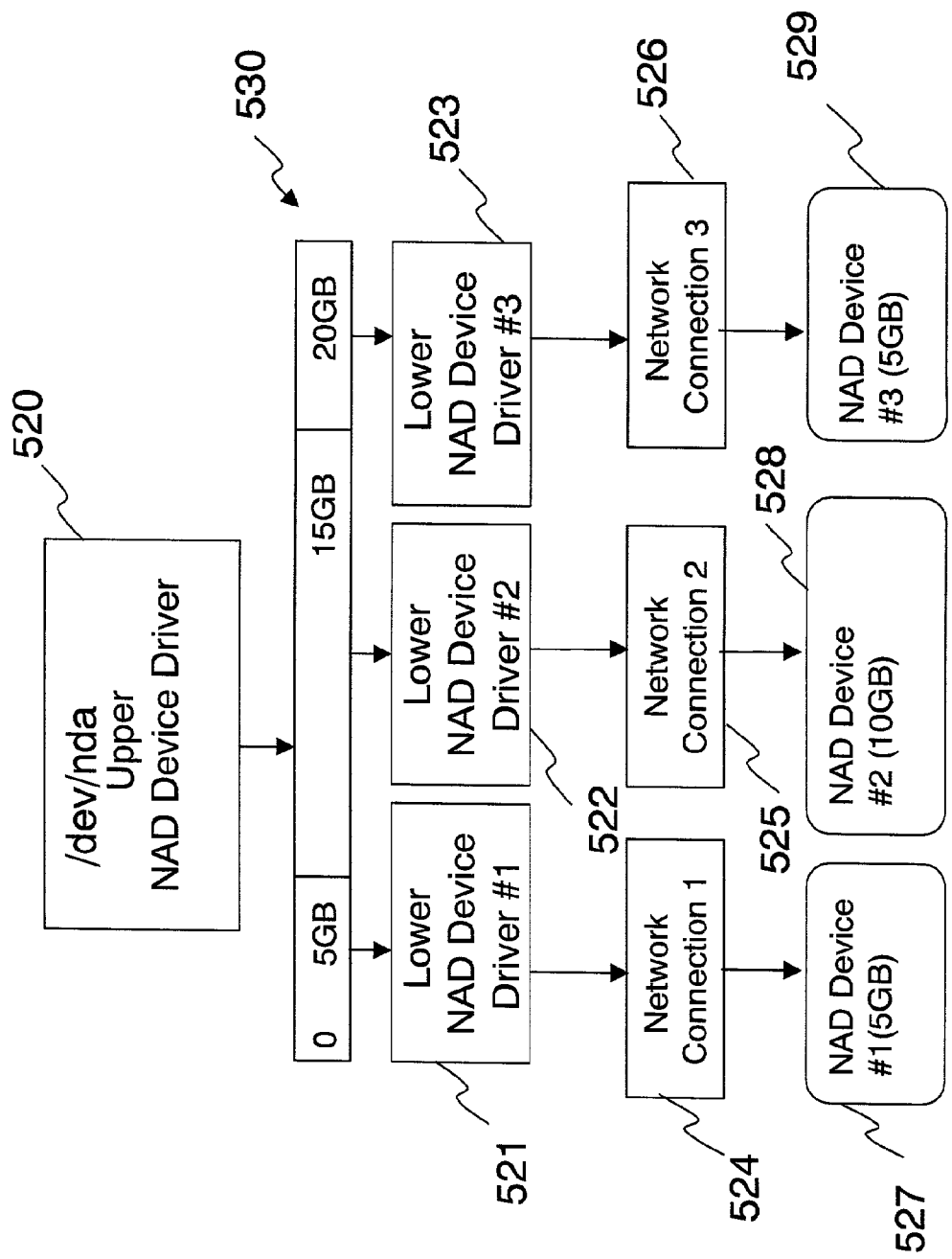
FIG. 19 is an illustration of how the NAD system can recognize physically separate, several NAD disks as a logically single disk.

FIG. 19 shows an example of how the present invention can recognize physically separate, multiple disks in different NAD devices as a logically single disk. Specifically, FIG. 19 shows that three lower-level NAD device drivers 521, 522 and 523 controlling NAD device #1 527 of 5 GB, NAD device #2 528 of 10 GB, and NAD device #3 529 of 5 GB, respectively, through separate network connections 524, 525 and 526, are united into a single upper-level NAD driver 520 partitioned into a configuration 530. The file system mounts "/dev/nda" to access the total space of 20 GB.

NAD System Running Under Windows Operating System

The foregoing system and method explained using examples running under the UNIX family of operating systems can equally be applied to implement an NAD system running under the Windows™ family of operating systems so that it can be recognized as a local disk. For example, an NAD device may treated as a local disk per se by a Windows 2000™ host so that all disk operations exercised by the host control a local disk, including formatting and partitioning, can be done to the NAD device.

This feature differentiates the present invention from other solutions, such as those provided by the NAS technology, which expand disk space through the intervention of a file system instead of directly adding individual disks at the device level of the host system. At the same time, since the NAD device is to be accessed through the network, the present invention redirects the disk I/O request to the network interface otherwise would be directed to the disk controller connected to the inside system bus in the case of using conventional local disks.

In other words, the present invention creates a virtual host bus adapter in purely software means by modifying a driver at the host so that the host recognizes the NAD device as if it is connected to the system bus through a physical host adapter although actually there is no physical host adapter connected to the bus. Since an NAD device is accessed as if it is a local device connected to the internal bus of a host, there is no need to use network addresses such as IP addresses for the host to communicate with the NAD device. Instead, data link frames containing storage commands are exchanged between the host and the NAD device.

Figure 20B:
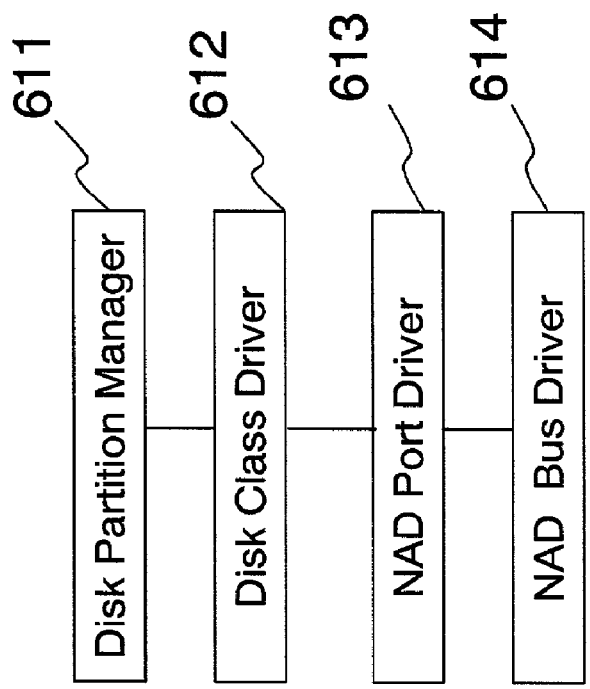
FIGS. 20A and 20B are illustrations of the hierarchies of the disk driver layers in the conventional disk system and the NAD system under the Windows 2000 operating system.
Figure 20A:
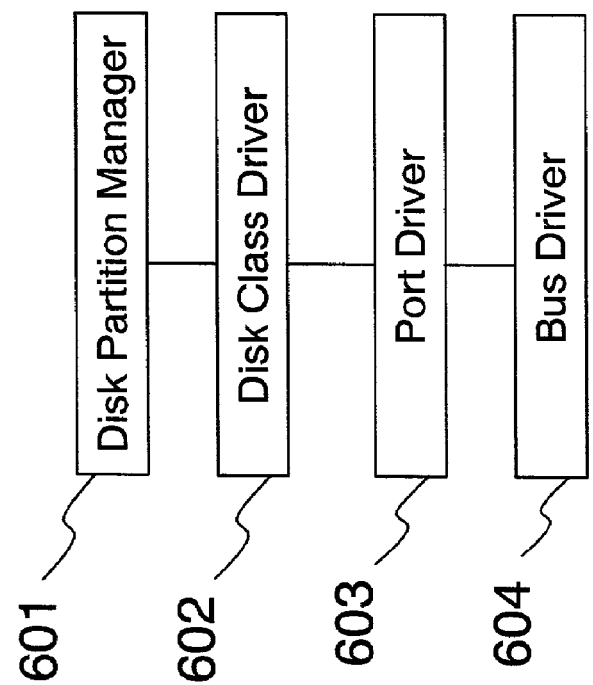

FIGS. 20A and 20B shows a comparison of the hierarchy of the disk driver between the conventional disk system and the NAD system of the present invention. FIG. 20A shows conventional disk driver layers in Windows 2000, which are organized in a hierarchy comprising a disk partition manager 601, a disk class driver 602, a port driver 603, and a bus driver 604.

In the Windows 2000 operating system, the generic term, 'bus', refers to a piece of hardware to which devices connect electronically. Not only does it include things like the PCI bus, but it also includes anything that can have multiple devices plugged into it such as a SCSI adapter, a parallel port, a serial port, a USB hub, and so on. One responsibility of the bus driver is to enumerate devices attached to the bus and to create physical device objects for each of them as necessary in Windows 2000. Therefore, the bus driver is a collection of software routines that contain the information about the specific bus and the functions that allocate system resources such as port addresses and IRQ numbers to the devices connected to the bus. It is the port driver that contains routines required to perform most of the actual disk I/O operations.

The major feature of the present invention is to replace the conventional bus driver and the port driver with a new bus driver and a new port driver so that the NAD devices can be recognized as the same as the local disks and the disk I/O operations can be performed to the NAD devices through the network port of the Windows 2000 host.

FIG. 20B shows the driver layers of the present invention, which have an NAD port driver 613 and an NAD bus driver 614 replacing the corresponding conventional Windows 2000 driver layers of FIG. 20A. The NAD bus driver 614 implements a virtual host bus adapter, through which disk I/O operations are to be done to and from a set of NAD devices. The NAD port driver 613 implements a set of routines required to perform actual disk I/O operations by redirecting the I/O requests to the NAD devices through the network port of a Windows 2000 host.

Figure 21:
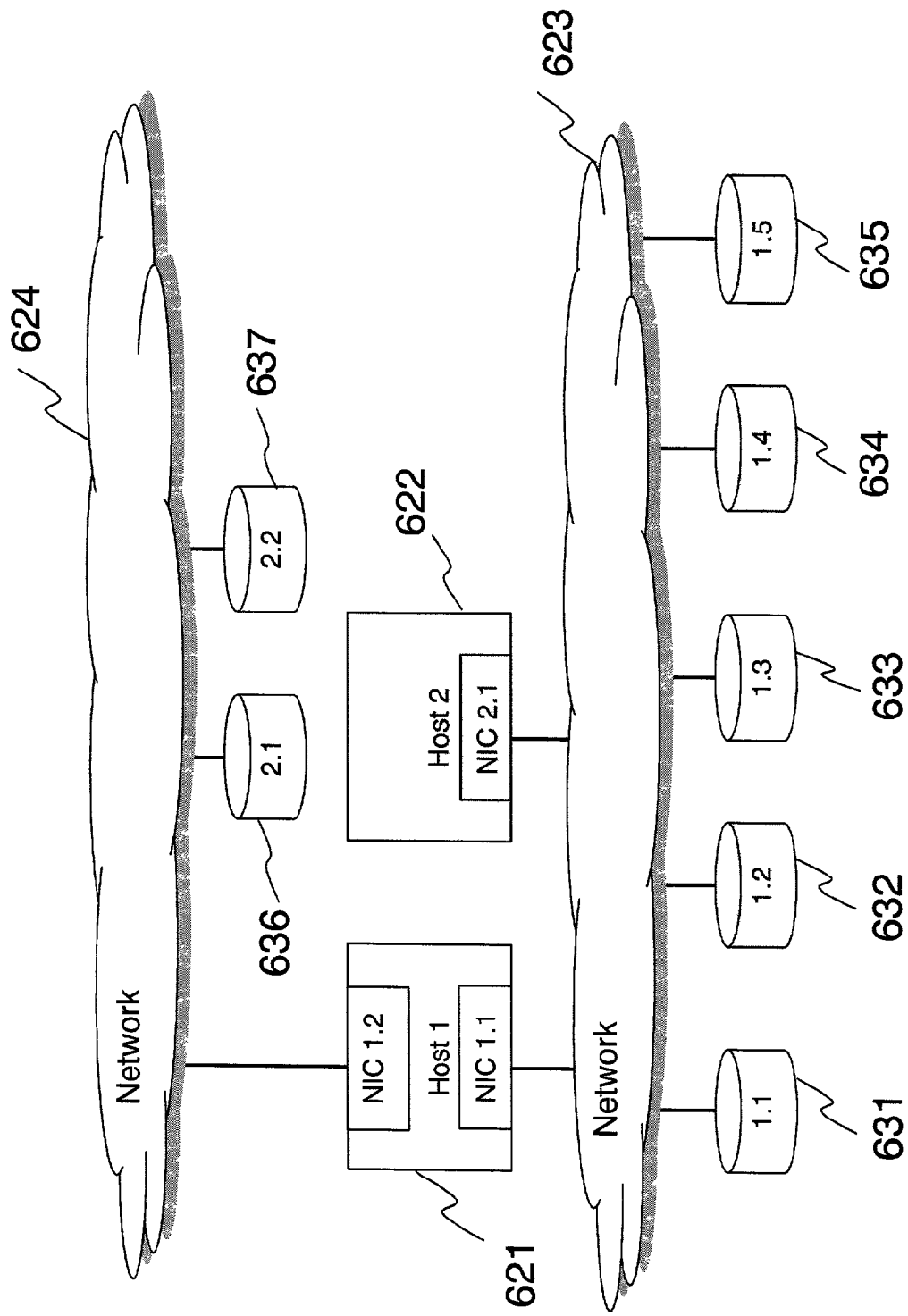
FIG. 21 is an illustration of a network environment where the NAD system of the present invention is used in the Windows 2000 operating system.

FIG. 21 shows an example of a network environment where NAD devices of the present invention are attached to multiple hosts. The example shows that both Host #1 621 and Host #2 622 run Windows 2000 connected to Network #1 623 and Network #2 624. Host #1 uses disk(1,1) 631 and disk(1,3) 633 through Network #1, disk (2,1) 636, and disk(2,2) 637 through Network #2 625. Similarly, Host #2 uses disk(1,2) 632, disk(1,4) 634 and disk(1,5) 635.

Given the NAD bus driver and the NAD port driver, a Windows 2000 system creates device stacks as specified in Windows 2000 in order to be able to process I/O requests. Each device in Windows 2000 is expressed in terms of device objects organized in a stack structure. Device objects are data structures that the Windows 2000 system creates to help software manage hardware. Many of these data structures can exist for a single piece of physical hardware. The lowest-level device object in a stack is called a physical device object (PDO). Above a PDO in a device object stack is an object called a functional device object (FDO). There may be a collection of filter device objects below and above the FDO. The Plug and Play (PnP) Manager component of Windows 2000 constructs the stack of device objects at the command of device drivers. The various drivers that occupy the stack for a single piece of hardware perform different roles. The function driver manages the device, and the bus driver manages the connection between the device and the computer.

Figure 22:
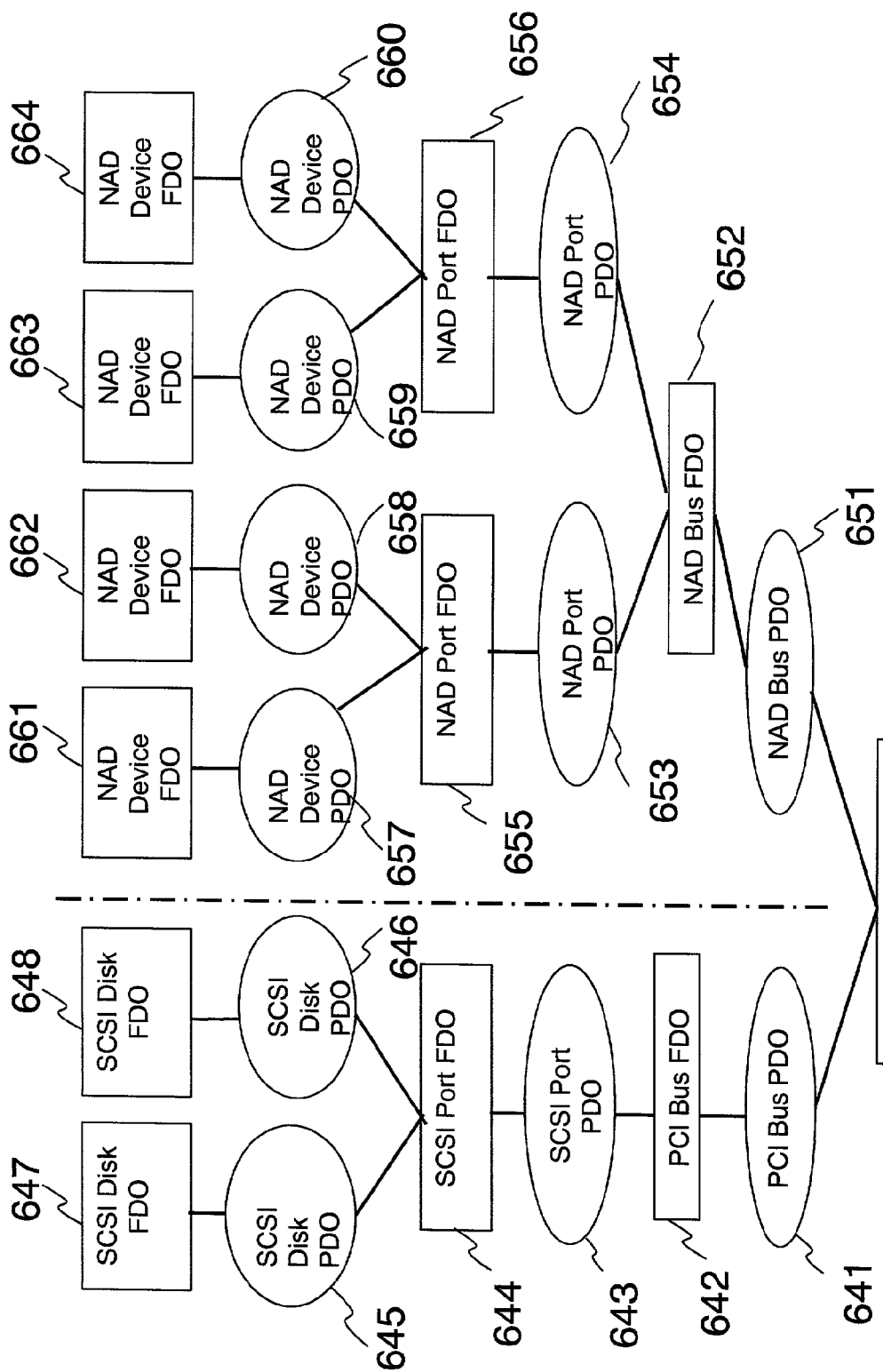
FIG. 22 is an example of a device stack created in the Windows 2000 operating system.

FIG. 22 shows an example of device stacks that may be created to implement the present invention, where all filter device objects are omitted for the simplicity. Shown on the left half is a layer of recursively enumerated SCSI devices on top of the PCI bus, which is typically the case when SCSI disks are connected to the host's PCI bus. In the first instance, a PnP Manager has a built-in driver for a virtual root bus that conceptually connects computer to all the hardware that can't electronically announce its presence including hardware bus such as PCI. The root bus driver 640 gets information about the PCI bus from the registry to create a PCI bus PDO 641, a PDO for the PCI bus, where the registry was initialized by a Windows 2000 setup program.

Having created the PCI bus PDO 641, the PnP Manager then loads functional drivers for the PCI bus, thus creating a PCI bus FDO 642. The functional driver of the PCI bus can then enumerate its own hardware devices attached to the PCI bus, where the example system in FIG. 21 assumes to have a set of SCSI devices, to create a SCSI port PDO 643. Once the SCSI port PDO 643 is created, the PnP Manager then loads drivers for SCSI port device, thus creating a SCSI port FDO 644. Similarly, SCSI disk PDOs, such as 645 and 646, are created for each of the individual SCSI disks on top of the SCSI port, and SCSI disk FDOs, such as 647 and 648, are in turn created by loading the disk class driver.

Shown on the right half of FIG. 21 is the corresponding device stacks for the NAD devices that would be created by using the NAD bus driver and NAD port driver replacing the PCI bus driver and the SCSI port driver, respectively. On top of the root is a NAD BUS PDO 651, the PDO of the NAD bus that is not conventional hardware bus such as PCI, but a bus required to fit in the Windows 2000 device stack in order to provide virtual bus for NAD devices. On top of the NAD bus PDO 651, the PnP Manager creates a NAD bus FDO 652 by loading a NAD bus driver.

A set of NAD Port PDOs 653 and 654 for each of individual network interface cards (NICs) of the Windows 2000 host are then created recursively since one NAD port is implemented to correspond to one NIC of the host in the present invention. On top of each NAD port PDO such as 653 or 654, each NAD port FDO such as 655 or 656 is created by loading a NAD port driver. It is the NAD port driver that performs the actual NAD disk I/O operations. The NAD port driver should handle the NAD device I/O requests by redirecting the I/O requests and obtaining the I/O replies to and from the corresponding NAD devices through the specific NIC. The NAD port FDO such as 655 or 656 then creates individual NAD device PDOs such as 657, 658, 659 or 660 on top of the specific NAD port for individual NAD devices that can be accessed through the specific NAD port bound to a specific NIC.

FIG. 22 shows that for the example in FIG. 21, two stacks of NAD port objects 653 and 654 are created because Host #1 has two NICs. Host #1 also has four NAD device PDOs 657 through 660, two for each NAD port, because NAD devices, i.e., disk(1,1) 631 and disk(1,3) 633 and disk(2,1) 636 and disk(2,2) 637 are to be accessed through the NIC(1,1) and NIC(1,2) respectively. For each individual NAD device PDO such as 657, 758, 659 or 660, the PnP Manager loads disk class driver to create a NAD device FDO such as 661, 662, 663 or 664.

Note here that the only NAD bus driver and NAD port driver are to replace the conventional bus driver and SCSI port driver respectively in order to substitute the NAD devices for the conventional local disks. Disk class driver and other higher level drivers of Windows 2000 should remain intact without a single change in order for the Windows 2000 system to recognize the NAD device as same as a local disk.

In Windows 2000, each request for an operation affecting a device uses an I/O request packet (IRP). IRPs are normally sent to the topmost driver of a stack for the device and can percolate down the stack to the other drivers. At each level, the driver decides what to do with the IRP. Sometimes, the driver does nothing except passing the IRP down. The driver may completely handles the IRP without passing it down or process the IRP and pass it down. In the case of disk I/O, for example as shown in FIG. 20B, an IRP for a file I/O sent to the file system driver is passed to a volume manager, a disk class partition manager, to a partition manager, and to disk class driver.

It is the disk class driver where a SCSI Request Block (SRB) is created to be included in the IRP as necessary. An SRB is a data structure specified in the Windows 2000 for SCSI device I/O. If the IRP is for the conventional local disk, the disk class driver passes the new IRP down to a SCSI port driver that completes actual disk I/O operation. If the IRP is for the NAD device connected to the network, the disk class driver passes the IRP down to NAD port driver that completes NAD device I/O through the network interface.

Without regard to the particular device type of the disk, local or NAD device, it is the feature of the Windows 2000 device stack as shown in FIGS. 20A and 20B that an IRP for a specific disk, local or network-attached, is directed eventually to the corresponding disk. This is because separate disk object stacks are created for each of the individual disks. FIG. 22 shows that separate SCSI disk FDO/PDOs and NAD device FDO/PDOs are bound to each of the individual local disks and NAD devices, respectively.

The present invention replaces the conventional disk bus driver and port driver with the new NAD bus and port drivers as shown in FIG. 20B so that NAD devices would be recognized as local disks by the Windows 2000 system.

All of the Windows 2000 device drivers have functions to create and remove the FDO for each device and dispatch functions to handle IRP passed down from the above driver layer. The major and minor function numbers in the IRP specify which of the dispatch functions will be invoked.

The following is an explanation of the actual software modules implemented in the NAD bus driver and port driver of the present invention in order to implement the NAD system for Windows 2000.

NAD Bus Driver

The NAD bus driver is a set of software modules that implement a virtual host bus adapter to which NAD ports are to be attached, where the individual NICs of a host are realized as NAD ports. The functions of the NAD bus driver are basically the same as those of a conventional PCI bus driver in Windows 2000. The NAD bus driver performs the functions of finding out the number of the NICs installed in the host computer and enumerating those NICs to create an NAD port PDO for each of the existing NICs. It also performs the functions of creating, starting, stopping, and removing an NAD port. In the NAD system, an individual NIC is regarded as an independent NAD port so that NAD disk ports for NAD devices are created according to the number of independently operating network units. See the example configuration shown FIG. 22.

The difference between the NAD bus driver and a conventional PCI bus driver is that the NAD bus driver is for NAD devices that are physically separated from the system bus of the host but are connected through network ports. Unlike a conventional Windows 2000 system that detects plug-in of a device to or removal of a device from the hardware bus through a hardware interrupt, the NAD bus driver is implemented by creating a kernel thread to install and remove an NAD port on the NAD bus. The kernel thread created by the NAD bus driver starts to work when an IRP with IRP_MJ_PNP as its major function number and IRP_MN_START_DEVICE as its minor function number is sent to the NAD bus FDO from the PnP Manager. The thread terminates when the NAD bus FDO is removed. The thread periodically detects existence of NICs. If a new NIC is detected, the thread creates a new NAD port PDO for the NIC and includes the newly created NAD port PDO into its own list of NAD port PDOs. The thread then invokes the PnP Manager to have the NAD port PDO recognized by the system. Removal of an MC is also detected by the thread since the thread can detect the absence of the MC of which NAD port PDO previously created would be found in the above mentioned list without the corresponding MC. If an NIC is found to have been removed from the host, the thread removes the corresponding NAD port PDO from its list and invokes the PnP Manager to remove the NAD port from the Windows 2000 system.

The software routines implemented in the NAD bus driver can be classified into five categories. The following tables list some of the routines implemented in the NAD bus driver with brief explanations.

TABLE 4

Basic functions

| | |
|---|---|
| DriverEntry( ) | executed when the driver is initially loaded |
| | registers dispatch routines of the NAD bus driver |
| | initializes the variables used by the driver |
| NADBusUnload( ) | recovers resources occupied by the driver when the driver is unloaded |
| NADBusAddDevice( ) | creates NAD bus FDO |
| | initializes the value of the NAD bus FDO |

TABLE 5

Dispatch functions

| | |
|---|---|
| NADBusCreate( ) | processes the 'IRP_MJ_CREATE' IRP |
| NADBusClose( ) | processes the 'IRP_MJ_CLOSE' IRP |
| NADBusPnp( ) | processes the 'IRP_MJ_PNP' IRP |
| | determines whether the IRP passed is to NAD bus FDO or to NAD port PDO, and invokes NADFDOPnP( ) or NADPDOPnP( ) accordingly |
| NADBusPower( ) | processes 'IRP_MJ_POWER' IRP |

TABLE 6

| | NAD bus FDO related functions | |
|---|---|---|
| NADBusFDOPnp( ) | invoked when IRP_MJ_PNP is sent to NAD bus FDO processes various minor functions according to the minor function number sent together | |
| | IRP_MN_START_DEVICE | transfer NAD bus FDO to 'started' state invokes NADBusStartFDO( ) |
| | IRP_MN_QUERY_STOP_DEVICE | invoked to query if NAD bus FDO can be stopped transfer NAD bus FDO to 'stop pending' state |
| | IRP_MN_CANCEL_STOP_DEVICE | invoked to cancel IRP_MN_QUERY_STOP_DEVICE |
| | IRP_MN_STOP_DEVICE | stops NAD bus FDO transfers NAD bus FDO to 'stopped' blocks NADBusHW( ) thread |
| | IRP_MN_QUERY_REMOVE_DEVICE | invoked to query if NAD bus FDO can be removed from the system |
| | IRP_MN_CANCEL_REMOVE_DEVICE | invoked to cancel IRP_MN_QUERY_REMOVE_DEVICE |
| | IRP_MN_SURPRISE_REMOVAL | invoked when NAD bus FDO is removed abnormally |
| | IRP_MN_REMOVE_DEVICE | invoked when NAD bus FDO is removed normally |
| | IRP_MN_QUERY_DEVICE_RELATIONS | passes list of NAD port PDO to PnP manager |
| NADBusStartFdo( ) | allocates resources to NAD bus FDO | |
| NADBusRemoveFdo( ) | recovers resources occupied by NAD bus FDO removes the NADBusHW( ) thread | |
| NADBusGetDeviceCapabilities( ) | passes DeviceCapability data dtructure to PnP manager | |

TABLE 7

| | NAD port PDO related functions |
|---|---|
| NADPortPDOPnp( ) | processes minor functions related to PnP invoked when IRP_MJ_PNP is sent to NAD port PDO Minor functions: IRP_MN_START_DEVICE IRP_MN_QUERY_STOP_DEVICE IRP_MN_CANCEL_STOP_DEVICE IRP_MN_STOP_DEVICE IRP_MN_QUERY_REMOVE_DEVICE IRP_MN_CANCEL_REMOVE_DEVICE IRP_MN_SURPRISE_REMOVAL IRP_MN_REMOVE_DEVICE IRP_MN_QUERY_CAPABILITIES IRP_MN_QUERY_ID IRP_MN_QUERY_DEVICE_RELATIONS IRP_MN_QUERY_DEVICE_TEXT IRP_MN_QUERY_RESOURCES_REQUIREMENTS IRP_MN_QUERY_RESOURCE |
| NADPortPDOQueryDeviceCaps( ) | returns DEVICE_CAPABILITIES data structure of NAD port |
| NADPortPDOQueryDeviceId( ) | returns device ID, instance ID, hardware ID of NAD port |
| NADPortPDOQueryDeviceText( ) | returns location and description of NAD port |
| NADPortPDOQueryDeviceRelations( ) | returns target device relation value |
| NADPortInitializePdo( ) | initialize NAD port PDO value invoked when NAD port attached to NAD bus is detected |
| NADPortDestroyPdo( ) | removes NAD port PDO and recovers resources |

TABLE 8

Function to detect NAD port

| | |
|---|---|
| NADBusHW( ) | routine for the kernel thread to detect NAD ports attached to NAD bus<br>periodically detects the existence of NICs<br>if a new NIC is detected, creates NAD port PDO and invokes NADPortInitializePdo( )<br>if a NIC is detected to have been removed, removes NAD port PDO by invoking NADPortDestroyPdo( ) |

NAD Port Driver

A port driver is a lower-level driver that responds to a system-defined device control request or a driver-defined device I/O control request from a corresponding class driver.

The NAD port driver is capable of basic functions to initialize the driver and create an NAD port FDO and dispatch functions to process IRP passed down from the disk class driver layer. The IRP passed down from the disk class driver may contain a SCSI request block (SRB), which specifies the actual I/O command to be performed onto the SCSI device.

Tables 9 and 10 list the basic functions and some of the dispatch functions, of which roles are basically the same as those of the NAD bus driver described earlier, are presented with brief explanations.

TABLE 9

Basic functions

| | |
|---|---|
| DriverEntry( ) | initializes driver<br>registers driver functions |
| NADPortAddDevice( ) | invoked by PnP manager to create NAD port FDO |
| NADPortDriverUnload( ) | invoked when to remove driver<br>recovers resources |

TABLE 10

Dispatch functions for initialization, creation, and removal of the NAD port

| | |
|---|---|
| NADPortCreateClose( ) | processes IRP_MJ_CREATE and IRP_MJ_CLOSE IRP |
| NADPortCleanup( ) | processes IRP_MJ_CLEANUP IRP<br>recovers resources |

TABLE 10-continued

Dispatch functions for initialization, creation, and removal of the NAD port

| | |
|---|---|
| NADPortPnp( ) | processes IRP_MJ_PNP IRP |
| NADPortPower( ) | processes IRP_MJ_POWER IRP |

In Windows 2000, a device I/O control command is included in an IRP as a device I/O control number, and the device I/O control functions are implemented in the port driver to handle the corresponding device I/O control numbers.

Besides the regular device I/O control functions in Windows 2000, additional device I/O control functions are implemented in the NAD port driver so that the NAD can be added or removed dynamically without stopping the Windows 2000 system. With conventional local disks, addition or removal of the local disk can be directly detected by the Windows 2000 system at the time of the system booting because the local disks are physically connected to the physical hardware bus. Therefore, the creation of a disk PDO for a local disk is basically initiated from the hardware interrupt at the time of the system booting. So the conventional port driver does not have to have functions that initiate addition or removal of the PDO of a disk device in the middle of the system operation.

However, in an NAD system, addition and removal of an NAD device can occur while the Windows 2000 system is running. Therefore, there should be a mechanism that can create/remove a disk PDO for the newly attached/removed disk.

The device I/O control functions implemented in the present invention handle such dynamic addition and removal of the NAD as follows. If a device control IRP that tells a new NAD hardware device is hooked up to the network is passed to the NAD port FDO, the NAD port FDO creates an NAD device PDO for the new NAD thus letting the system recognize the disk. For the removal of the NAD device, device control IRP to remove the disk is sent to and processed by NAD port FDO similarly.

The dispatch functions that handle device I/O control IRPs are summarized in the following table. Note that the device I/O control functions, NASPortFdoDeviceControl( ), NADPortPluInDevice( ) and NADPortUnpluDevice( ) are the functions particular to the present invention for the purpose of dynamic addition and removal of the NAD.

TABLE 11

NAD port device control dispatch functions

| | |
|---|---|
| NADPortDeviceControl( ) | invoked when I/O control IRP is passed<br>processes IRP_MJ_DEVICE_CONTROL IRP<br>invokes NADPortFdoDeviceControl( ) for FDO control<br>invokes NADPortPdoDeviceControl( ) for PDO control |
| NADPortFdoDeviceControl( ) | registers new NAD device or removes an NAD device<br>processes I/O control functions<br>IOCTL_NADPORT_PLUGIN_HARDWARE<br>Invokes NADPortPlugInDevice( ) to register new NAD hardware<br>IOCTL_NADPORT_UNPLUG_HARDWARE<br>invokes NADPortUnplugDevice( ) to remove an NAD hardware |
| NADPortPdoDeviceControl( ) | processes I/O controls for PDO<br>invokes I/O control functions according to the device I/O control function numbers in the IRP<br>IOCTL_STORAGE_QUERY_PROPERTY<br>queries NAD device property<br>IOCTL_GET_DISK_DRIVE_GEOMETRY |

TABLE 11-continued

Figure 23:
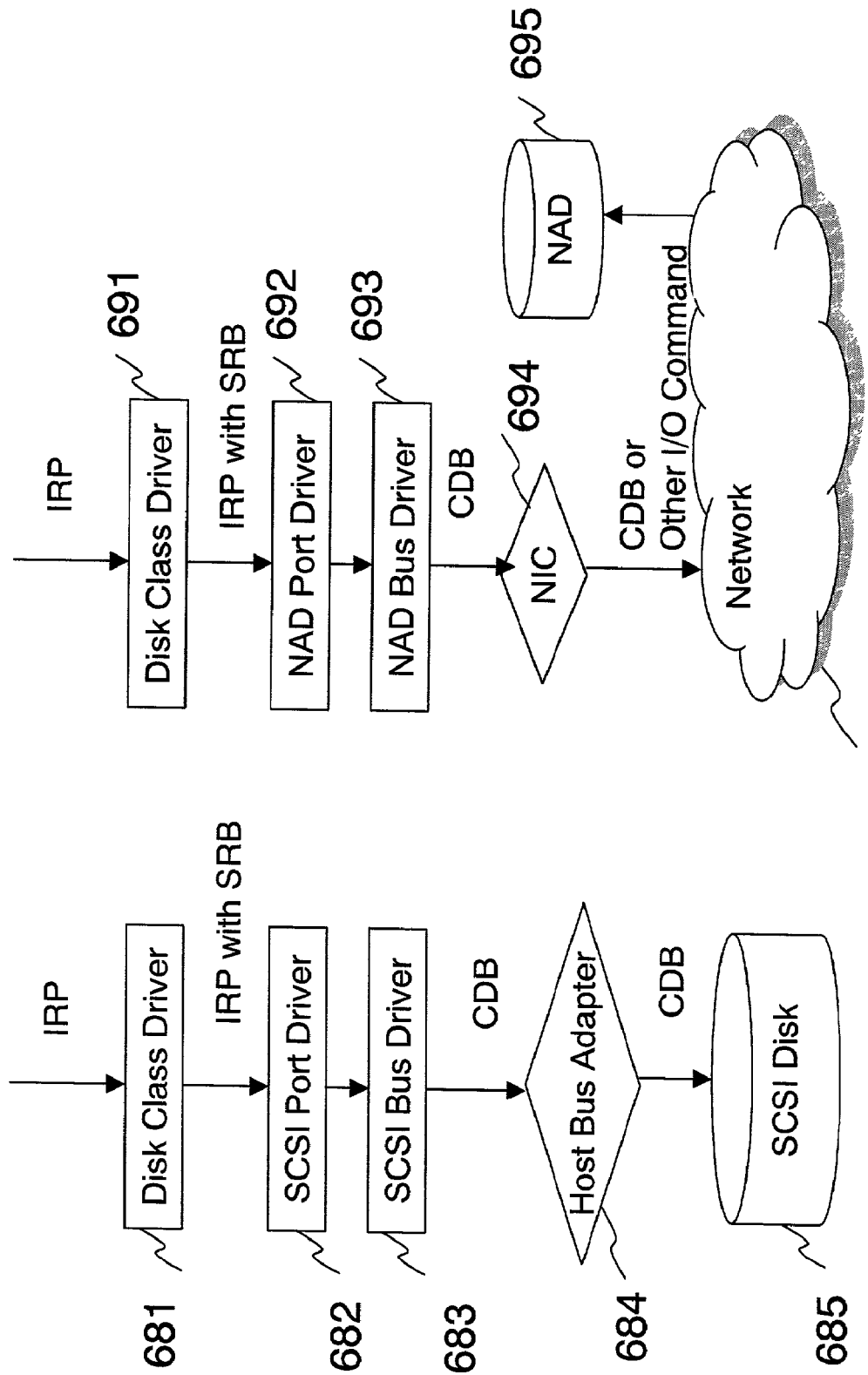
FIG. 23A is an illustration of the flow of IRP, SRB, and CDB in a conventional disk system in the Windows 2000 operating system.
FIG. 23B is an illustration of the flow of IRP, SRB and CDB in an NAD system in the Windows 2000 operating system.

NAD port device control dispatch functions returns DISK_GEOMETRY data structure containing
geometry information of the NAD device
IOCTL_GET_SCSI_ADDRESS
NAD device does not use SCSI address, so sets the values
of PathID and TargetID 0s and returns enumeration number
of NAD device to LUN in CDB FIG. 23A shows the flow of IRP, SRB, and CDB where the IRP is to a SCSI disk connected to a conventional hardware bus such as PCI bus in a Windows 2000 system. A disk class driver 681 passes down to a SCSI port driver 682 and a SCSI bus driver 683 an IRP that may contain an SRB. The SRB is a data structure that contains information about the requested I/O and a command descriptor block (CDB) containing a SCSI-2 standard command. Receiving the IRP with SRB from the disk class driver, the SCSI port driver 682 and the SCSI bus driver 683 deliver the CDB extracted from the SRB to the SCSI host adapter 684 to complete an actual device I/O to a SCSI disk 685.

In a conventional local disk, disk I/O commands are delivered to a disk controller at the host adapter using the SRB data structure. But, in the NAD system of the present invention, disk input/output commands are delivered to the NIC of the host.

devices. The translation of the CDB, in such a case, can be done either at the NAD port driver or at the NAD device. If the translation is to be done at the NAD, the Windows 2000 host simply delivers a CDB to the host NIC as if it delivers a CDB to a SCSI disk. If the translation is to be done at the NAD port driver, the NAD port driver functions must translate the CDBs into a set of disk I/O commands appropriate to the specific hardware disk types.

The NAD system of the present invention supports both cases, and the type of the commands, i.e., CDB or hardware-specific commands, is determined at the time of the installation of the specific NAD. Some of the dispatch functions that process SRB with mandatory CDB operation codes are given in table 12 to show how the NAD port driver functions are implemented to handle the SRB and CDB in the present invention. Such SRB processing functions are required if the NAD port driver has to translate the CDB into a set of hardware specific I/O commands.

TABLE 12

| | | |
|---|---|---|
| NADPortInternalDeviceControl( ) | executes SrbFunctionExecuteScsi( ) when SRB_FUNCTION_EXECUTE_SCSI is passed as the SRB function value | |
| SrbFunctionExecuteScsi( ) | processes CDB invokes CDB processing functions according to the CDB operation codes given below | |
| | SISCOP_TEST_UNIT_READY | tests if an NAD device is accessible |
| | SCSIOP_MODE_SENSE | returns configuration of NAD device |
| | SCSIOP_READ | reads a block from NAD |
| | SCSIOP_WRITE | write a block to NAD |
| | SCSIOP_MODE_SELECT | sets parameter to NAD |
| | SCSIOP_READ_CAPACITY | returns size of the next block or address of the last block |
| | SCSIOP_REASSIGN_BLOCKS | relocates block |
| | SCSCIOP_RESERVE/SCSIOP_RELEASE | changes status information |
| | SCSIOP_START_UNIT | starts NAD |
| | SCSIOP_STOP_UNIT | stops NAD |
| | SCSIOP_VERIFY | verifies data stored in NAD |

FIG. 23B shows the flow of IRP, SRB, and CDB (or some other types of I/O commands) in the NAD system. A disk class driver 691 passes down an IRP with an SRB to a NAD port driver 692 and a NAD bus driver 693, which then deliver the CDB extracted from the SRB to MC 694 to complete an actual device I/O to a NAD device 695 through a network 696.

In the present invention, the NAD system supports various types of disks including SCSI and IDE. If the NAD device is composed of SCSI disks only, the CDB is delivered as is to the host MC so that the network-attached SCSI disks can perform the requested disk I/O.

If the NAD device, however, is composed of disk devices of other type than SCSI such as IDE, the CDB must be translated into the commands that can be processed by the specific Communication Between the Host and the NAD Disk I/O commands in the NAD system are delivered to the host NIC instead of the local disk host adapter because the I/O should be done over the network rather than over the bus. Windows 2000 provides a Network Driver Interface Specification (NDIS), a set of specifications defined to specify network interface drivers.

Figure 24:
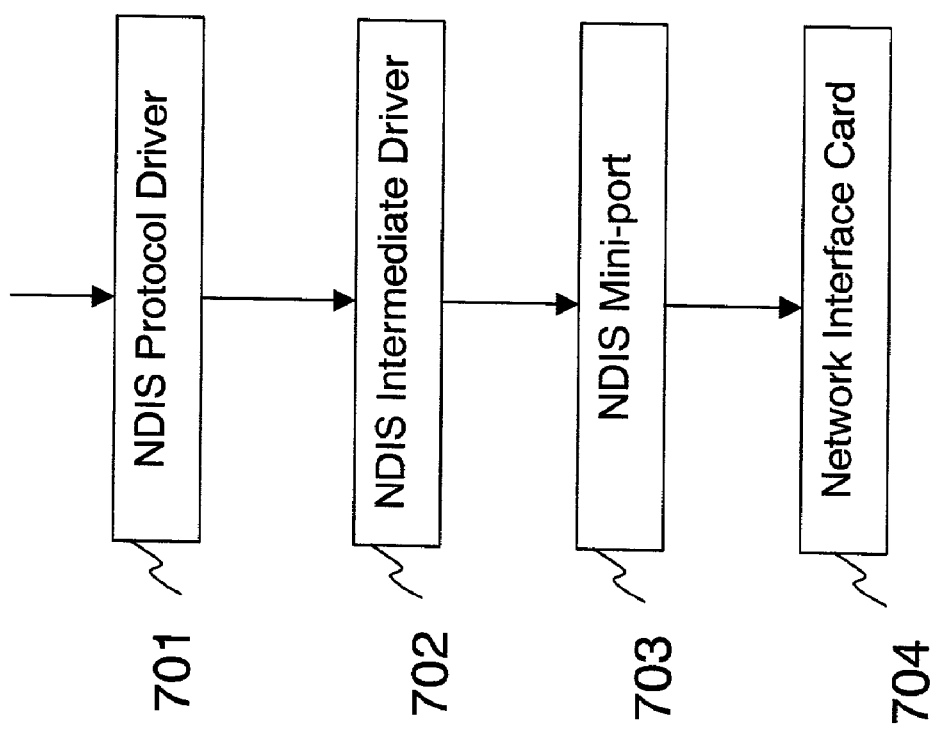
FIG. 24 is an illustration of NDIS (Network Device Interface Specification) in the Windows 2000 operating system.

FIG. 24 shows a NDIS driver layer defined in Windows 2000. It consists of a NDIS protocol driver 701 for specifying a high-level protocol to be used, a NDIS intermediate driver 702, an NDIS miniport 703 for managing hardware specifics, and a network interface card (MC) 704.

In the present invention, all the NAD port driver functions that deliver I/O commands to the NAD devices are implemented to deliver the commands to a NDIS (network driver interface specification) protocol driver layer through which the commands are delivered to the NAD devices over the network.

Upon receiving from the disk class driver the IRP containing an SRB or an I/O control command for specific disk I/O operation, the NAD port driver passes down a new IRP containing the corresponding CDB to the protocol driver. Then the protocol driver sends the CDB, which is the SCSI-2 standard I/O command, to the NAD device and, in turn, receives and handles the reply from the NAD device. Note here that if the host computer has to send some hardware specific I/O commands other than CDB as is pointed out in FIG. 23B, the NAD port driver passes down an IRP containing the hardware specific commands instead of the CDB to the NDIS protocol driver.

The NDIS provides transport-independence for network vendors because all drivers that require communication over the network calls the NDIS interface to access the network, thus providing a ready solution for the communication between the host computer and the NAD devices in the present invention.

The actual protocol implemented in the protocol driver of the NDIS may adopt a standard protocol or a non-standard protocol. Since a standard protocol such as IP (Internet Protocol) involves an overhead, a non-standard protocol may be preferred in terms of performance and security. The present invention follows the NDIS specification of the Windows 2000 network system to implement a proprietary communication protocol into the NDIS protocol driver in order to provide a communication protocol between a Windows 2000 host and NAD devices to reliably handle the NAD I/O commands.

NAD Device

The technical constitution of the NAD device running under the Windows family of operating systems is the same as that of the NAD device running under the UNIX family of operating systems shown in FIG. 14.

Advantages of the NAD System over NAS and SAN

Either running the UNIX or Windows family of operating systems, the NAD system of the present invention has numerous advantages over the NAS system and the SAN system. Unlike the NAS system that provides file storage service by way of an additional file server, the NAD device is attached to a host computer as if it is a local disk connected to the system bus of the host. Unlike the SAN system, the NAD device of the present invention is simply plugged into a network port without requiring any additional special switch or network equipment. Therefore, the NAD system provides better user convenience, system flexibility, scalability, economy, and performance.

All the disk-related operations, including formatting, partitioning, sharing, and mounting, can be done to NAD devices just as they can be done to a local disk. Since NAD devices are directly available to the host as local disks, the NAD system provides better manageability and user convenience. In the NAS system, addition, deletion, or any change to the disk configuration should be consulted to the NAS operating system through human or software intervention. In the NAD system, addition or deletion of an NAD device is instantly achieved by plugging or unplugging the NAD device to and from a network port. The NAD system even provides a superior user convenience in installing and uninstalling the disks, eliminating the need of opening and closing the case of the host computer.

The NAD system provides almost unlimited scalability to the disk capacity. The number of NAD devices that can be attached to the network is virtually unlimited, whereas the number of disks available through the NAS system is severely limited because of an economical reason and the inconvenience involved in the management of the multitudes of NAS servers.

The NAD system is intrinsically more economical than the NAS or SAN system because each NAD device does not employ file server software and other additional special hardware equipment.

Media Changeable NAD System

An NAD system of the present invention can be alternatively implemented as a media changeable storage device. A media changeable storage device is a special storage device that is physically separated two parts, one being the media containing the data and the other being the driver performing an I/O operation to the media. Floppy disk drivers, CD-ROM drivers are examples of media changeable storage devices. Whether a media is installed or not, a media changeable storage device can be registered to a host computer so that a media such as a diskette can be inserted into a driver dynamically.

Since NAD devices can be plugged in or removed from a network port dynamically, a virtual driver that uses NAD as a media can be implemented in the form of a media changeable storage device. Windows 2000 provides the changer class driver model to implement a media changeable storage device. In order to implement a media changeable NAD system, a class driver for the NAD system is implemented according to the model of the changer class driver of Windows 2000. The two lower-level drivers, i.e. the NAD port driver and the NAD bus driver, are used to implement such media changeable NAD system.

Alternative Embodiment Using Converter and Counter-Converter

Instead of using a network interface card (NIC) and new virtual host bus adapter, the network attached disk of the present invention may be implemented by providing in the host side a protocol converter that converts storage commands into data link frames containing the storage commands so that the frames can be sent through a network, and by providing in the device side a counter-converter that converts the data link frames containing the storage commands received through the network into the storage commands.

Since a converter is a specialized network interface, the converter encapsulates the I/O commands and data to data link frame so as transmit them to an I/O device through a network without the overhead of processing communication protocols in general.

Tape System, CD Juke Box

The kinds of storage devices that can be directly connected to a network using the interface of the present system are not limited to disk systems. Tape systems and CD drives use IDE or SCSI interface, the same bus interface as disk systems. For example, the present invention may be used to connect multiple CD drives directly to a network, enabling a cost-effective implementation of a CD-Juke box.

While the invention has been described with reference to preferred embodiments, it is not intended to be limited to those embodiments. It will be appreciated by those of ordinary skilled in the art that many modifications can be made to the structure and form of the described embodiments without departing from the spirit and scope of this invention.

The invention claimed is:

1. A network-attached device (NAD) access system wherein a host, having an internal host system bus and running an operating system, controls an external device through a carrying general-purpose network traffic using a certain network protocol, the system comprising:
   a network interface card (NIC) installed at the host for providing a general purpose network connection between the host and the network and via the network to other devices coupled to the network;
   a network-attached device (NAD) having a data storage to store data, the NAD coupled to the network for receiving device level access commands from the host in data link frames according to the certain network protocol through the network; and
   a device driver, running at the host, for creating a virtual host bus adapter in software controlling the NAD through the network via the NIC, the device driver enumerating NAD that are available over the network, not directly attached to the host internal system bus, to make the host recognize the NAD as a host local device;
   the virtual host bus adapter controlling the NAD in a way indistinguishable from the way as a physical host bus adapter device controls device so that the host recognizes the NAD as if it is a local device connected directly to the system bus of the host.

2. The NAD system of claim 1, wherein the network is a wired network.

3. The NAD system of claim 1, wherein the network is a wireless network.

4. The NAD system of claim 1, wherein the NIC is an Ethernet card.

5. The NAD system of claim 1, wherein the operating system is the UNIX family of operating systems.

6. The NAD system of claim 5, wherein the device driver comprises a device file and device driver routines for the device driver to register the device driver to the host.

7. The NAD system of claim 6, further comprising a device accessing thread for accessing the NAD device.

8. The NAD system of claim 6, further comprising a device searching thread for searching for a device attached to the network.

9. The NAD system of claim 6, further comprising a network connection setting thread for making a connection between the device driver and the NAD device.

10. The NAD system of claim 6, wherein the NAD disk further comprises a plurality of individual disk partitions.

11. The NAD system of claim 10, wherein the device driver comprises a plurality of individual device drivers, each individual device driver for controlling the individual disk partition whereby each individual disk partition is accessed as an independent local disk.

12. The NAD system of claim 10, wherein the device driver comprises a plurality of individual partitions, each driver partition for controlling each individual disk partition.

13. The NAD system of claim 1, further comprising a second NAD device, a second device driver, and a unified device driver combining the device driver and the second device driver so that the NAD device and the second NAD device are recognized as logically a single local device.

14. The NAD system of claim 1, wherein the driver includes: a bus driver for creating the virtual host adapter to access the NAD device as fit is a local device connected directly to the system bus of the host; and a port driver for communicating the disk access command from the host to the NAD device through a network port.

15. The NAD system of claim 14, wherein the operating system is the Windows family of operating systems.

16. The NAD system of claim 1, wherein the NAD device further comprises:
   a disk controller for controlling the disk; and
   a network adapter for receiving the disk access command through the network.

17. The NAD system of claim 16, wherein said one or more disks are formatted as local disks.

18. The NAD system of claim 16, further comprising a filter program providing a utility function.

19. The NAD system of claim 18, wherein the utility function includes the function of controlling sharing of access among multiple hosts.

20. The NAD system of claim 18, wherein the utility function includes the function of controlling transfer of access right of one host to another.

21. The NAD system of claim 18, wherein the utility function includes the function of providing automatic back-up of the NAD device.

22. The NAD system of claim 18, wherein the utility function includes the function of controlling access to the NAD device.

* * * * *